United States Patent
Kizawa et al.

(10) Patent No.: US 6,950,953 B2
(45) Date of Patent: Sep. 27, 2005

(54) NETWORK SYSTEM PROVIDED WITH MULTIFUNCTIONAL PRINTER AND TERMINAL APPARATUS CONNECTED TO THE MULTIFUNCTIONAL PRINTER

(75) Inventors: Makoto Kizawa, Utsunomiya (JP); Tamotsu Sato, Utsunomiya (JP); Masami Hirakawa, Utsunomiya (JP); Takashi Hanada, Utsunomiya (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 585 days.

(21) Appl. No.: 10/158,130

(22) Filed: May 31, 2002

(65) Prior Publication Data

US 2003/0140260 A1 Jul. 24, 2003

(30) Foreign Application Priority Data

Aug. 27, 2001 (JP) ...................................... P2001-256842

(51) Int. Cl.[7] ................................................. G06F 1/32
(52) U.S. Cl. ....................... 713/324; 713/320; 713/324; 399/9
(58) Field of Search ................................. 713/324, 323, 713/320; 399/9

(56) References Cited

U.S. PATENT DOCUMENTS

| | | | | |
|---|---|---|---|---|
| 5,552,860 A | * | 9/1996 | Yamashita et al. | 399/19 |
| 6,088,806 A | * | 7/2000 | Chee | 713/322 |
| 6,314,523 B1 | * | 11/2001 | Voltz | 713/324 |
| 6,711,361 B2 | * | 3/2004 | Tanimoto | 399/9 |
| 6,763,473 B1 | * | 7/2004 | Nomizu et al. | 713/324 |

* cited by examiner

*Primary Examiner*—A. Elamin
(74) *Attorney, Agent, or Firm*—Greenblum & Bernstein, P.L.C.

(57) ABSTRACT

A multifunctional printer is provided with a main CPU that controls the entire apparatus, main power unit that supplies power to the main CPU, sub CPU that shuts down the power supply from the main power unit to the main CPU at a predetermined condition and restores the power supply from the main power unit to the main CPU upon detecting a factor canceling the power supply shut-down, PC interface board that informs the sub CPU about the factor canceling the power supply shut-down upon detecting a printing request from a PC, and sub power unit that supplies the power to the sub CPU and PC interface board separately from the main power unit.

20 Claims, 17 Drawing Sheets

NETWORK SYSTEM PROVIDED WITH MULTIFUNCTIONAL PRINTER AND TERMINAL APPARATUS CONNECTED TO THE MULTIFUNCTIONAL PRINTER

BACKGROUND OF THE INVENTION

1. Field of the Invention

This invention relates to a multifunctional printer provided with an energy saver mode that saves power consumption during a standby, a terminal apparatus connected to the multifunctional printer, and a network system provided with the multifunctional printer and terminal apparatus.

2. Description of Related Art

Recently, multifunctional printers are provided with an energy saver mode that controls power consumption within a certain amount when no operation is performed during a preset period. And, there is a need for more power consumption reduction during the energy saver mode.

Conventional facsimile apparatuses (hereafter referred to as FAX) are also provided with energy saver modes and have been considered to have the smallest power consumption during the energy saver mode. The below describes the energy saver mode in a FAX.

A FAX normally includes a main CPU and panel CPU as sub CPU. During a predetermined time period, the FAX monitors whether an operation is performed such as pressing a key. If no operation is performed, the power supply to the main CPU is shut, and only minimum operations are allowed using the sub CPU. Accordingly, only the sub CPU receives the power supply during the energy saver mode, while shutting the power supply to the main CPU, which largely reduces the power consumption down to 1.4 W.

To restore the FAX from the energy saver mode to a ready mode, the sub CPU monitors energy saver cancel factors. When such a factor is detected, the main power switch is turned on to supply the power back to the main CPU. Energy saver canceling factors include an incoming message being detected, a document set, and a key pressed.

However, the above-described technology cannot be applied to a multifunctional printer having a printer function. Therefore, the power consumption of a multifunctional printer during an energy saver mode has been significantly large.

In particular, unlike the energy saver mode of a FAX, it is impossible to shut the power supply to the main CPU during the energy saver mode of a multifunctional printer having a printer function. Instead, the power supply to units that can be turned off, such as fixed parts and scanner, have been shut down while maintaining the power supply to the main CPU.

In a multifunctional printer with a printer function, a printer driver inside a connecting PC has a status monitoring function monitoring the status of the multifunctional printer. Therefore, the PC monitors the status by periodically accessing the multifunctional printer even when the multifunctional printer is in an energy saver mode. The multifunctional printer is required to communicate with the PC to respond to the access from the PC. Since the communication with the PC is performed by starting up a software program, the main CPU has to be started even during the energy saver mode. Therefore, the multifunctional printer cannot shut down the power supply to the main CPU during the energy saver mode, thus consuming much more power approximating from 20 W–30 W during the energy saver mode.

If the multifunctional printer with the printer function shuts down the power supply to the main CPU in order to lower the power consumption during the energy saver mode, the multifunctional printer cannot respond to the status monitoring access from the PC, and the PC misinterprets that the multifunctional printer as a printer is having an error. In this case, the PC misinterprets that the multifunctional printer is having an error every time the multifunctional printer activates an energy saver mode, and keeps sending the wrong message to the user.

Additionally, the multifunctional printer is not only incapable of responding to the status monitoring from PC in this case, but also to a printing request, thereby causing the multifunctional printer to a lose important function as a multifunctional printer.

Further, when the power supply to the main CPU is shut down during the energy saver mode, it is possible to respond to the printing request from the PC and maintain a printer function as a multifunctional printer, if an access from the PC can be included as one of the energy saver cancel factors. However, the status monitoring access from the PC will also be considered as an energy saver cancel factor. Since the status monitoring from the PC is performed periodically, the energy save mode will be canceled frequently, thus practically impairing the energy saver mode.

SUMMARY OF THE INVENTION

The present invention addresses the above-described problems. The purpose of this invention is to provide a multifunctional printer, a terminal apparatus connected to the multifunctional printer, and a network system provided with the multifunctional printer and terminal apparatus by which it is possible to minimize the power consumption during the energy saver mode, maintain a printer function for PCs during the energy saver mode, enable the status monitoring function of the PCs, and prevent the system from practically impairing the energy saver mode.

This invention is provided with a main controller that controls the entire apparatus, main power unit that supplies power to the main controller, energy saver controller that shuts down the power supply from the main power unit to the main controller at a predetermined condition and restores the power supply from the main power unit to the main controller once a factor canceling the power supply shut-down is detected, interface unit that informs the energy saver controller about the factor canceling the power supply shut-down when a printing request from an external terminal apparatus is detected, and sub power unit that supplies the power to the energy saver controller and interface unit separately from the main power unit.

Since this invention monitors the energy saver cancel factors by using the energy saver controller with less power consumption during the energy saver mode, it is possible to shut the power supply to the main controller and minimize the power consumption during the energy saver mode.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

First Embodiment

Figure 1:
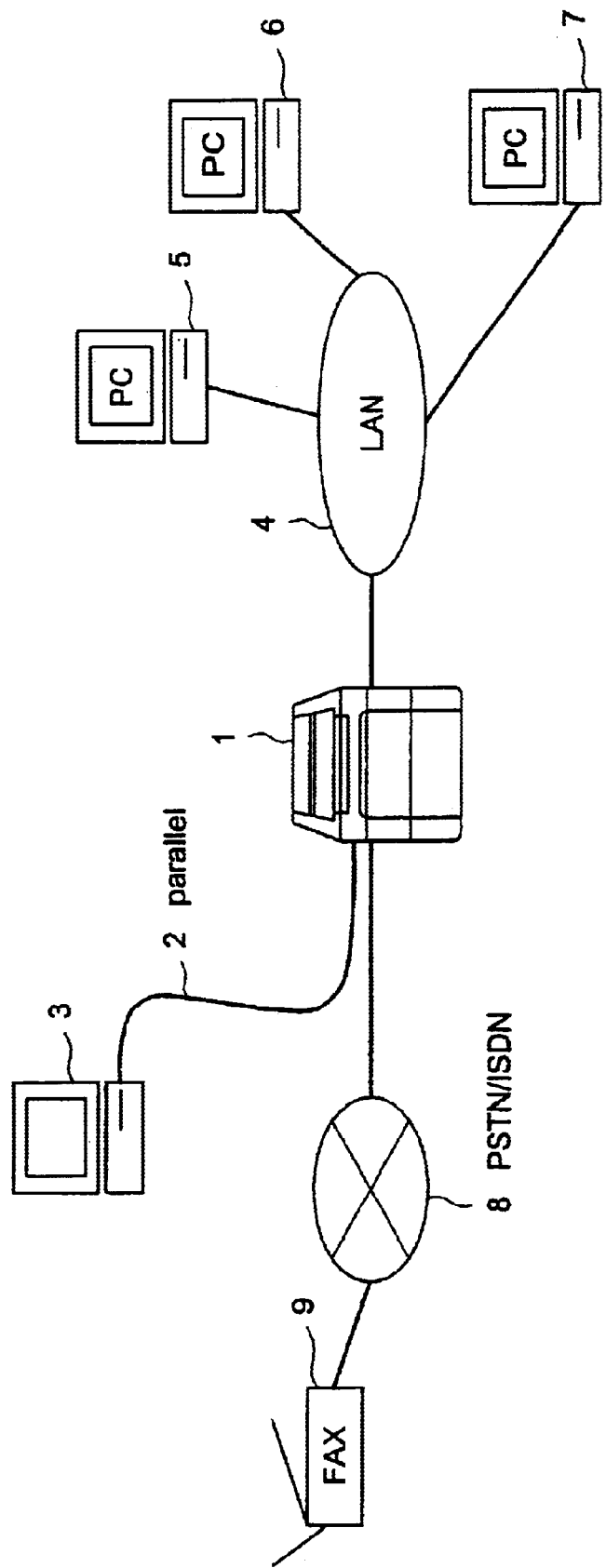
FIG. 1 is a schematic diagram of a network in which the multifunctional printer according to an embodiment of the present invention operates.

FIG. 1 is a schematic diagram of a network in which the multifunctional printer according to an embodiment of the present invention operates.

Multifunctional printer 1 has functions as a recording apparatus (e.g., printer), copying apparatus (e.g., copier), and image communication apparatus (e.g., facsimile). In FIG. 1, multifunctional printer 1 is connected to a plurality of host apparatuses via separate transmission paths.

In particular, multifunctional printer 1 is connected to personal computer (hereafter referred to as PC) 3 as a terminal apparatus via parallel cable 2. Also, multifunctional printer 1 is connected to PCs 5–7 via computer network 4 such as a LAN, as well as to FAX 9 via analog/digital public telephone network (hereafter referred to as PSTN/ISDN) 8.

Figure 2:
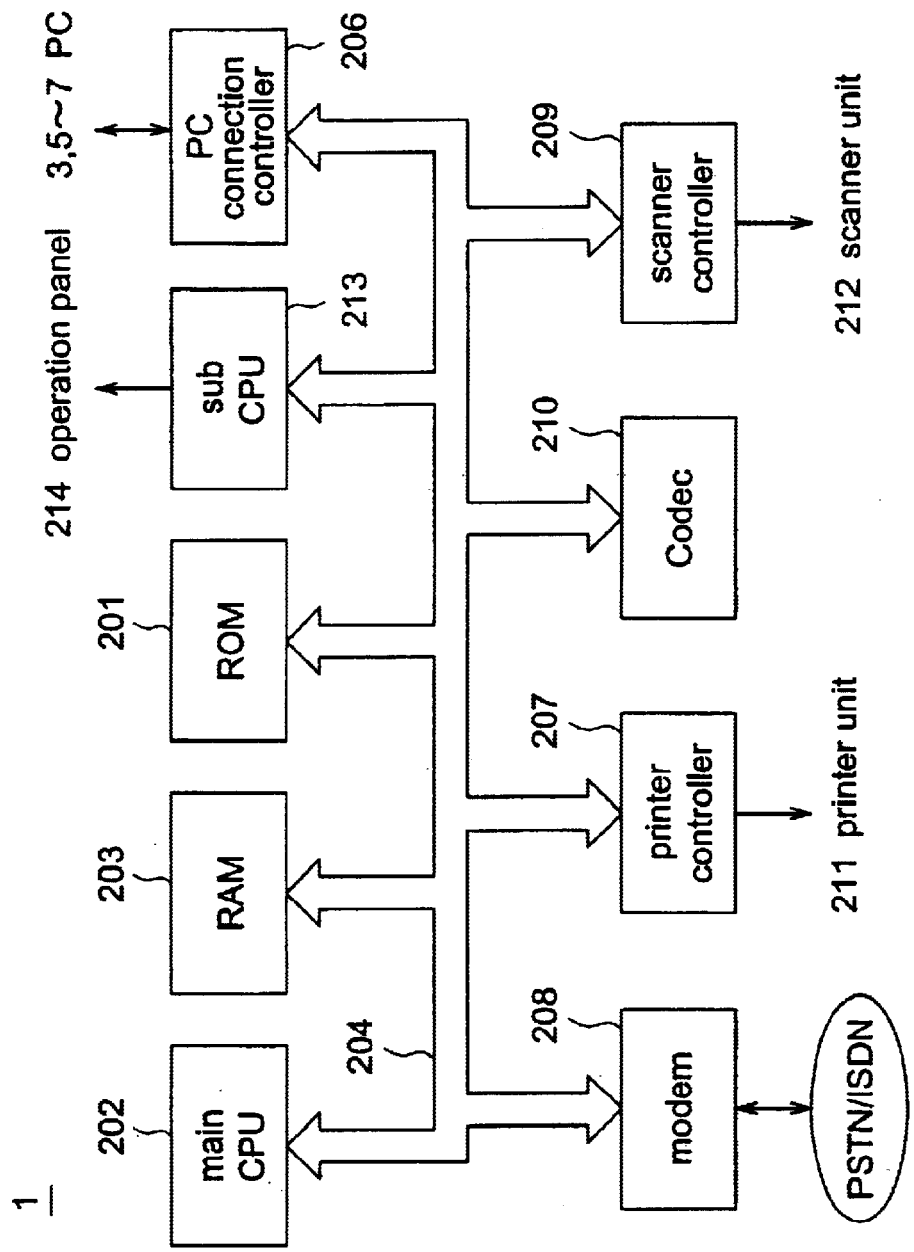
FIG. 2 is a schematic block diagram illustrating a configuration of the multifunctional printer according to the embodiment.

FIG. 2 is a schematic block diagram illustrating a configuration of multifunctional printer 1 according to the embodiment.

In multifunctional printer 1, ROM (Read Only Memory) 201 stores programs to provide functions as the above-described recording, copying, and image communication apparatuses. Main CPU 202 provides the above-described functions as the recording, copying and image communication apparatuses by executing these programs and using RAM 203 as a work area.

PC connection controller 206, printer controller 207, modem 208, scanner controller 209, and encoder/decoder (hereafter referred to as codec) 210 are connected to main CPU 202 via bus 204.

PC connection controller 206 controls data exchanges with PC 3 connected via parallel cable 2, LAN or computer network 4 such as Internet connected via LAN. Therefore, multifunctional printer 1 is capable of performing a data communication with PC 3 connected via parallel cable 2 and PC 5 connected to computer network 4.

Printer controller 207 controls printer unit 211 of multifunctional printer 1. Printer unit 211 prints directed printing data under the control of printer controller 207.

Modem 208 is connected to PSTN/ISDN 8 via which modem 208 performs data and facsimile communications. Therefore, multifunctional printer 1 is capable of performing a facsimile communication with FAX 9 or the like, which is distantly located.

Scanner controller 209 controls scanner unit 212 of multifunctional printer 1. Scanner unit 212 scans document image data under the control of scanner controller 209.

Codec 210 encodes/decodes data scanned by scanner 212 and received by modem 208.

Sub CPU 213 functioning as a panel controller is also connected to main CPU 202 via bus 204. Sub CPU 213 communicates with operation panel 214 of multifunctional printer 1 using commands or the like, which are reported to main CPU 202. An operator of multifunctional printer 1 is able to give certain instructions to multifunctional printer 1 from operation panel 214.

In addition, operation panel 214 is provided with a touch panel including a key to input an instruction to activate a mode to reduce the power consumption (hereafter referred to as energy saver mode) and canceling the energy saver mode (hereafter referred to as energy saver key) and a display to display status information of multifunctional printer 1.

Also, sub CPU 213 functions as an energy saver controller monitoring energy saver cancel factors, after multifunctional printer 1 activates the energy saver mode. Details of the energy saver controller function of sub CPU 213 are later described.

Figure 3:
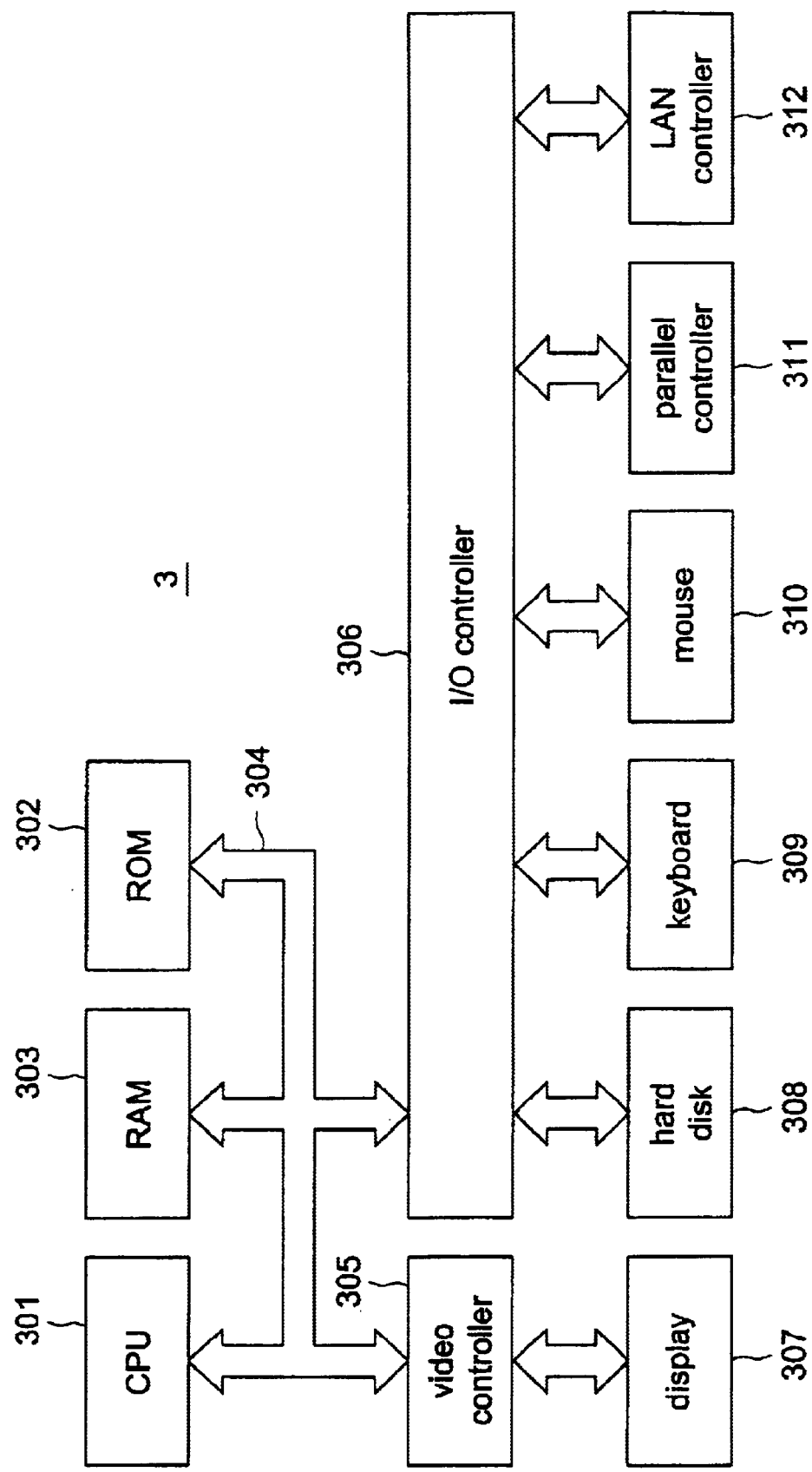
FIG. 3 is a schematic block diagram illustrating a configuration of a PC as a terminal apparatus connected to the multifunctional printer according to the first embodiment of the present invention.

FIG. 3 is a schematic block diagram illustrating a configuration of PC 3 (5–7) as a terminal apparatus connected to multifunctional printer 1 according to the embodiment of the present invention. In this embodiment, PC 3 connected to multifunctional printer 1 via parallel cable 2 is used for the explanation.

PC 3 as the terminal apparatus connected to multifunctional printer 1 according to the present embodiment has the same configuration as of a normal PC, except that PC 3 has a function to perform a communication mode using special steps with multifunctional printer 1 after activating the later-described energy saver mode. In particular, PC 3 is provided with CPU 301 that controls the entire constituents configuring PC 3. CPU 301 retrieves a desired program from programs stored in ROM 302 and executes the same, using RAM 303 as a work area.

Video controller 305 and I/O (input/output) controller 306 are connected to CPU 301 via data bus 304. Video controller 305 converts a signal input from CPU 301 into video data and displays the same on display 307.

I/O controller 306 is connected to hard disk 308 as an external memory unit, keyboard 309 as an input unit, mouse 310 as a pointing device, parallel controller 311 and LAN controller 312.

Parallel controller 311 controls transmission/reception of command and data input via parallel cable 2. LAN controller 312 controls transmission/reception of command and data input via computer network 4 such as LAN.

Multifunctional printer 1 according to the present embodiment activates the energy saver mode with an instruction from the energy saver key on the operation panel 214 or triggered by a non-operational state for a predetermined time period. At this time, multifunctional printer 1 shuts down the power supply to the main power of two built-in power sources (main power and sub power) so that the energy saver mode is activated with the power supply only from the sub power. In order to cancel the energy saver mode, the power supply from the main power is restored.

Multifunctional printer 1 of the present invention and connected PC 3 are characterized by having a system of activating and canceling the energy saver mode. Hereafter, a configuration providing the system of activating and canceling the energy saver mode in multifunctional printer 1 is illustrated.

Figure 4:
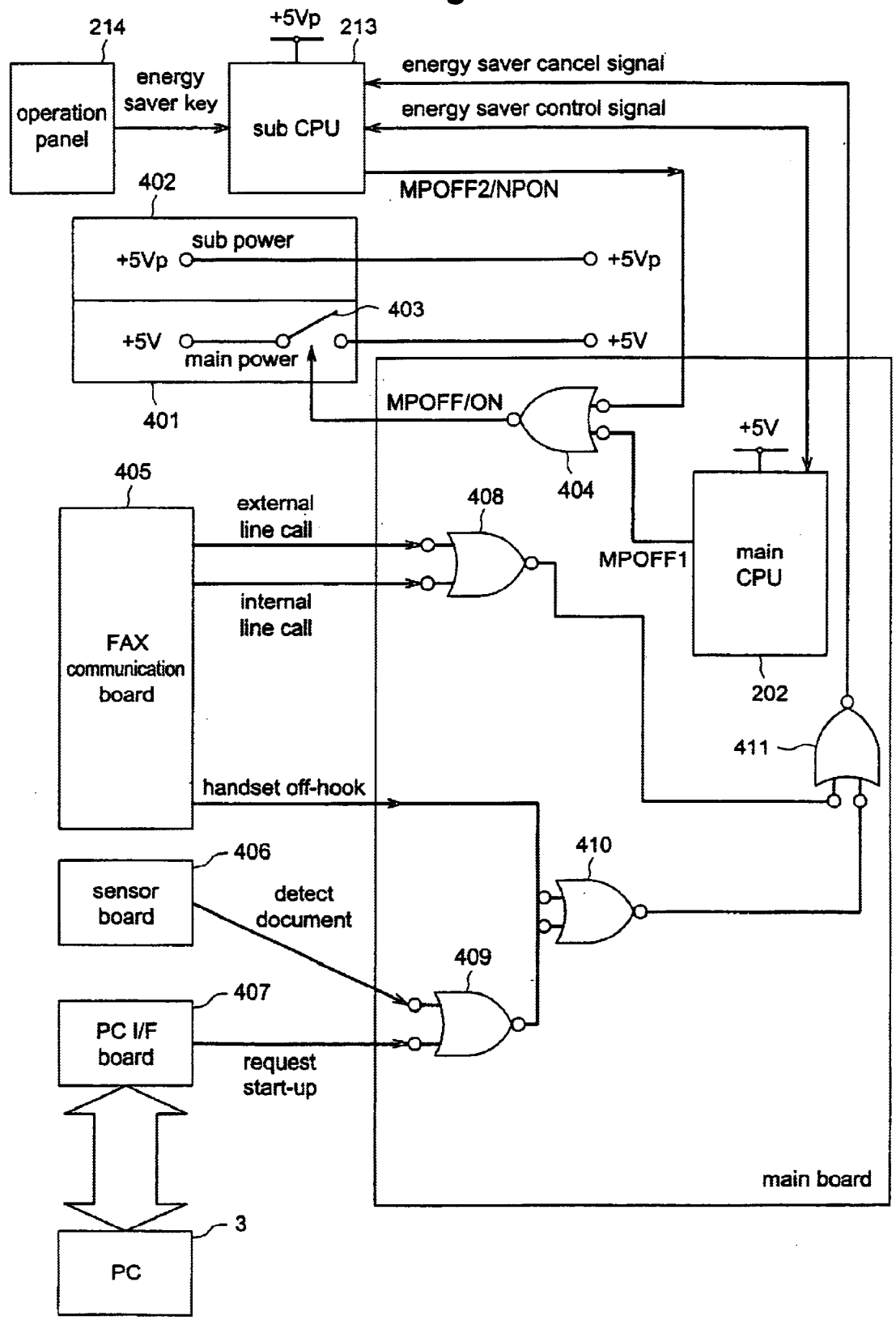
FIG. 4 is a block diagram illustrating a configuration to provide an energy saver mode of the multifunctional printer according to the first embodiment of the present invention.

FIG. 4 is a block diagram illustrating the configuration providing the system of activating and canceling the energy saver mode in multifunctional printer 1.

As shown in the figure, multifunctional printer 1 has two power sources: main power 401 as a main power unit; and sub power 402 as a sub power unit. Main power 401 supplies 5 V power to main CPU 202, while sub power 402 supplies 5 V power to sub CPU 213. Sub power 402 also supplies power to each configuration detecting energy saver cancel factors (e.g., above-described PC interface board) when multifunctional printer 1 activates the energy saver mode. When multifunctional printer 1 activates the energy saver mode, the power is supplied only to sub CPU 213. For a mode other than the energy saver mode (hereafter referred to as ready mode), the power is supplied to both main CPU 202 and sub CPU 213.

The power supply to main CPU 202 of main power 401 is switched by power supply switch 403. Power supply switch 403 shuts off the power supply to main CPU 202 by turning off main power 401 and main CPU 202 when a main power OFF signal (MPOFF) is input.

The main power OFF signal (MPOFF) is input to power supply switch 403 when main power OFF signal 1 (MPOFF1), which is output from main CPU 202, is input to one of input terminals of determination circuit 303 connected to power supply switch 403, and main power OFF signal 2 (MPOFF2) which is output from sub CPU 213, is input to the other input terminal.

In other words, the main power OFF signal (MPOFF) is input to power supply switch 403 only when both main power OFF signal 1 (MPOFF1) and main power OFF signal 2 (MPOFF2) are input to determination circuit 404.

Sub CPU 213 functioning as an energy saver controller transmission/reception energy saver control signal with main CPU 202. In this embodiment, an energy saver control signal is a signal transmitted/received in order to check whether the energy saver mode can be activated, or to instruct on activating the energy saver mode.

There are two situations for transmitting an energy saver control signal. One is the signal being transmitted from sub CPU 213 to main CPU 202, and the other is from main CPU 202 to sub CPU 213. An example of the first situation is that sub CPU 214 checking with main CPU 202 for an activation of the energy saver mode when the energy saver key is selected from operation panel 214. An example of the second situation is that main CPU 202 gives an instruction to sub CPU 213 for an activation of the energy saver mode when a non-operational state for a predetermined time period is detected by a built-in timer in main CPU 202.

When multifunctional printer 1 activates the energy saver mode, sub CPU 213 monitors a signal canceling the energy saver mode (hereafter referred to as energy saver cancel signal). Upon detecting the energy saver cancel signal, sub CPU 213 outputs a main power ON signal (MPON) to determination circuit 404.

When the main power ON signal is input to one of the input terminals of determination circuit 404, the signal is input to power supply switch 403. When power supply switch 403 connects main power 401 and main CPU 202 according to the input of the main power ON signal, the power supply to main CPU 202 is restored. Accordingly, the energy saver mode is canceled.

The energy saver cancel signal input by sub CPU 213 is generated by a plurality of factors. Examples of the factors in multifunctional printer 1 are a call from external/internal line from FAX communication board 405 functioning as modem 208, a off hook state by a handset, a document detection by sensor board 406 operating under the control of scanner controller 209, and a start-up request from a PC via PC interface board (hereafter referred to as PC I/F board) 407 operating under the control of PC connection controller 206.

A signal generating the energy saver cancel signal such an outside call from FAX communication board 405 is input to one of the input terminals in a plurality of determination circuits 408–411. When even one signal generating the energy saver cancel signal is input to one of the input terminals in these determination circuits 408–411, the energy saver cancel signal is input to sub CPU 213.

Figure 5:
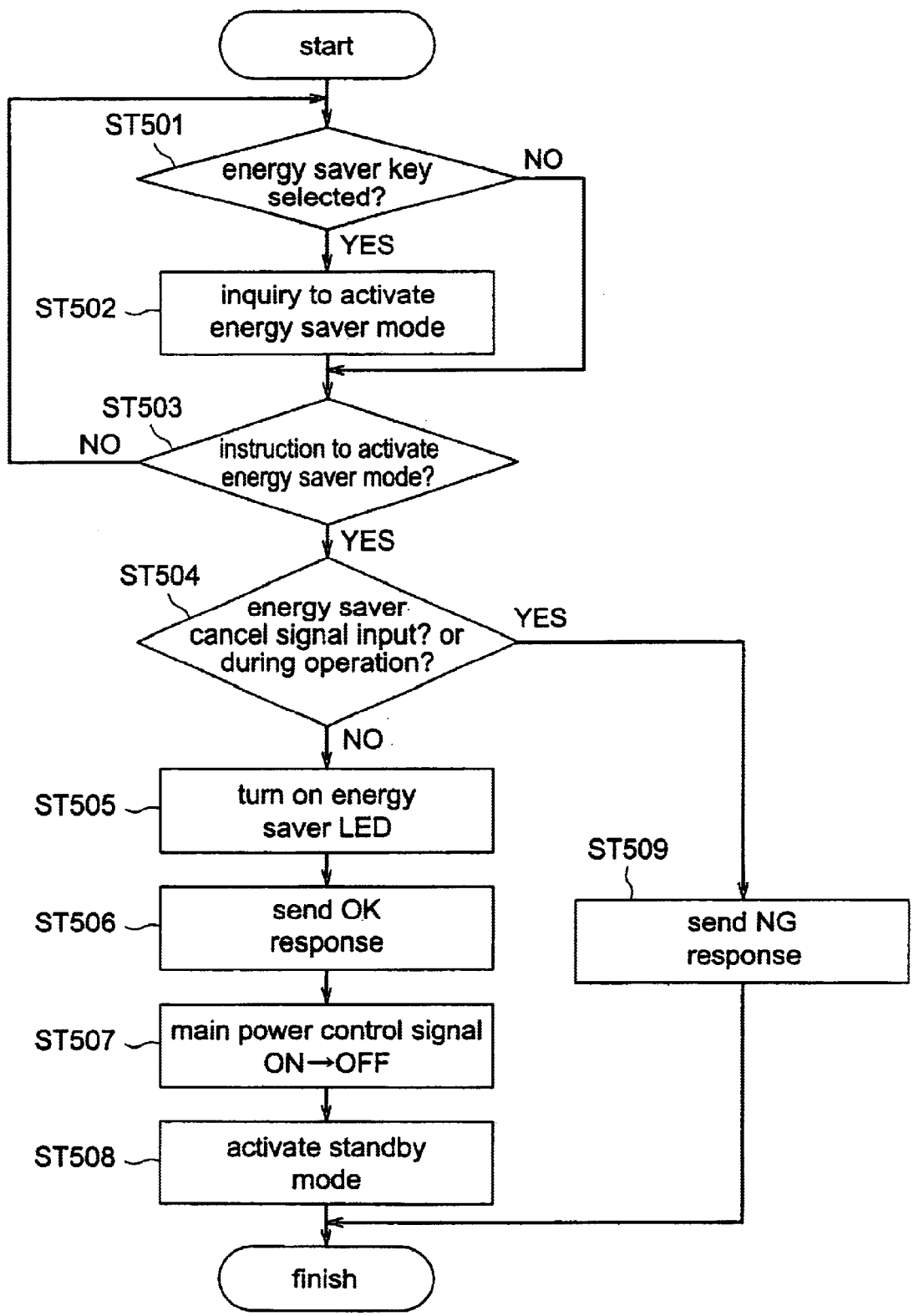
FIG. 5 is a flowchart illustrating a control of a sub CPU when the energy saver mode is activated in the multifunctional printer according to the first embodiment of the present invention.

Hereafter, a control flow of sub CPU 213 when multifunctional printer 1 activates and cancels the energy saver mode is illustrated. First, the control flow of sub CPU 213 when multifunctional printer 1 activates the energy saver mode is illustrated. FIG. 5 is a flowchart illustrating the control of sub CPU 213 when the energy saver mode is activated in multifunctional printer 1.

Sub CPU 213 functions as a panel controller as described above. Therefore, when multifunctional printer 1 is in the ready mode, sub CPU 213 always monitors whether the energy saver key on operation panel 214 is selected (ST 501). If the energy saver key is selected, sub CPU 213 transmits an energy saver control signal inquiring for activating the energy saver mode to main CPU 202 (ST 502). This is because there are situations in which the energy saver mode cannot be activated immediately even if the energy saver mode is instructed (e.g., during recording of data received by facsimile).

If this energy saver control signal is received, main CPU 202 checks whether the energy saver mode can be activated. If so, main CPU 202 returns the energy saver control signal instructing on activating the energy saver mode back to sub CPU 213. Therefore, sub CPU 213 monitors a reception of this energy saver control signal (ST 503).

Also, main CPU 202 transmits the energy saver control signal instructing on activating the energy saver mode upon detecting a non-operational state for a predetermined time period by the built-in timer. Therefore, sub CPU 213 monitors a reception of the energy saver control signal even if the energy save key is not selected at ST 501 (ST 503).

Upon receiving an energy saver control signal instructing on activating the energy saver mode, sub CPU 213 checks whether an energy saver cancel signal has been input or operation panel 214 is being currently used (ST 504).

This is because even if an instruction for activating the energy saver mode is given at ST 503, there are situations in which the operator inputs some instruction from operation panel 214, or a facsimile message is received afterwards. Therefore, sub CPU 213 rechecks whether the energy saver mode can be activated at ST 504.

If any of the above situations are not present at ST 504, sub CPU 213 turns on an energy saver LED informing the operator that multifunctional printer 1 is currently in the energy saver mode (ST 505).

After turning on the energy saver LED, sub CPU 213 transmits an energy saver control signal informing that the activation of the energy saver mode is confirmed (OK response) to main CPU 202 (ST 506).

At the same time, sub CPU 213 switches a main power ON signal to a main power OFF signal 2 (ST 507). Accordingly, the main power OFF signal 2 is input to one of the input terminals of determination circuit 404 connected to power supply switch 403.

Upon confirming the energy saver control signal transmitted at ST 506, main CPU 202, on the other hand, outputs main power OFF signal 1. Accordingly, the main power OFF signal 1 is input to the other input terminal of determination circuit 404.

Since the main power OFF signal 1 and main power OFF signal 2 are input to both input terminals of determination circuit 404, a main power OFF signal is input to power supply switch 403. Accordingly, the power supply to main CPU 202 is shut off, and the energy saver mode is activated.

After outputting main power OFF signal 2 at ST 507, sub CPU 213 activates a standby mode (ST 508), and the operation of the energy saver mode activation is completed. A standby mode is a mode in which sub CPU 213 stops its own signal transmission and only inputs of an energy saver cancel signal and input from operation panel 214 are monitored.

Also, when the energy saver cancel signal is received at ST 504, an energy saver control signal informing that energy saver mode cannot be activated (NG response) is transmitted to main CPU 202 (ST 509), and the activation of the energy saver mode is completed.

Figure 6:
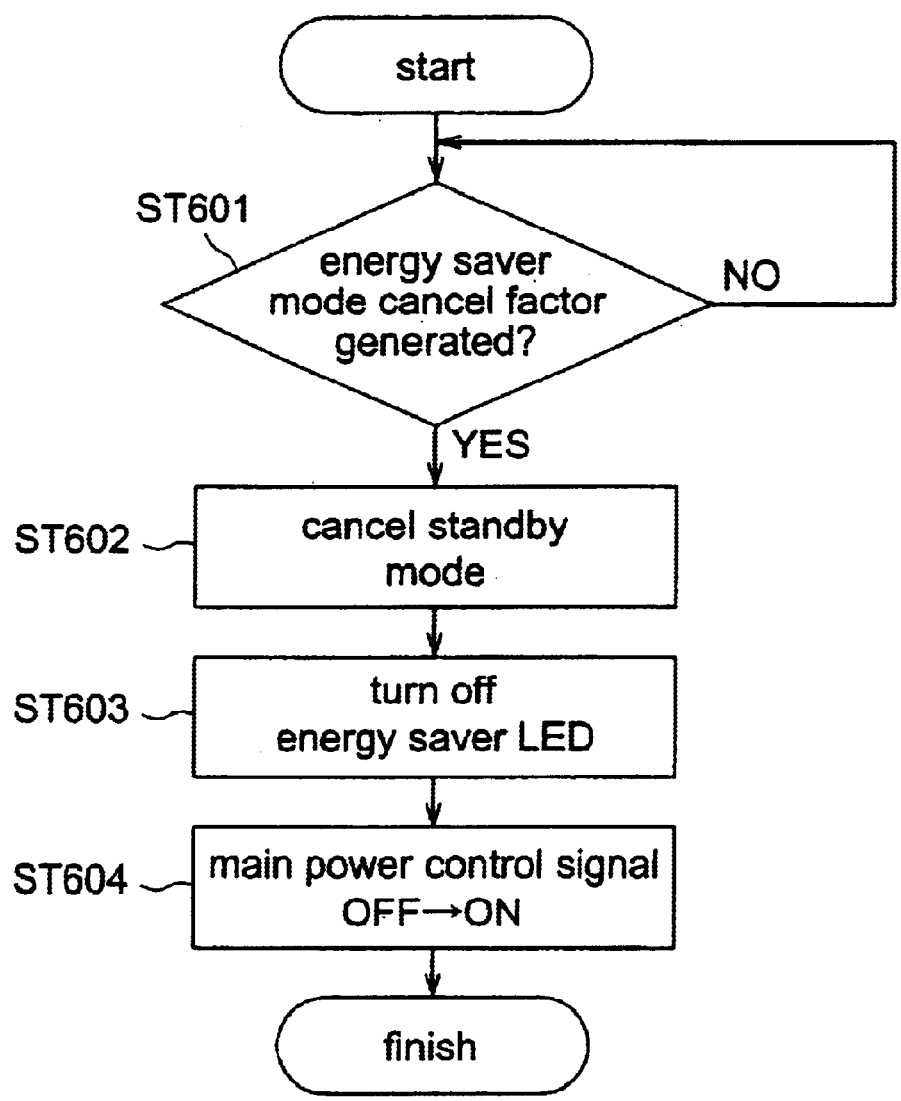
FIG. 6 is a flowchart illustrating a control of the sub CPU when the energy saver mode is canceled in the multifunctional printer according to the first embodiment of the present invention.

Next, the control flow of sub CPU 213 when canceling the energy saver mode in multifunctional printer 1 is illustrated. FIG. 6 is a flowchart illustrating the control of sub CPU 213 when the energy saver mode is canceled.

After activating the energy saver mode, sub CPU 213 monitors the existence of the energy saver cancel factors (ST 601). In particular, selection of the energy saver key at operation panel 214 and input of energy saver cancel signal is monitored.

When an energy saver cancel factor is detected at ST 601, sub CPU 213 cancels the standby mode (ST 602), and turns off the energy saver LED (ST 603).

Further, the main power OFF signal 2 is switched to the main power ON signal (ST 604). Also, the main power ON signal is input to one of the input terminals of determination circuit 404 connected to power supply switch 403. Then, the main power ON signal is input to power supply switch 403. Accordingly, the power supply to main CPU 202 is restored and the energy saver mode is canceled.

In multifunctional printer 1, sub CPU 213 monitors the selection of the energy saver key on operation panel 214 and energy saver cancel signal input as energy saver cancel factors. Generating factors of the energy saver cancel signal include an outside call from FAX communication board 405, document detection from sensor board 406, and processing request from PC 3 via PC I/F board 407. Among these factors generating the energy saver cancel signal, multifunctional printer 1 focuses on processing requests from PC 3, and cancels the energy saver mode only when the energy saver mode actually needs to be canceled.

In particular, processing requests from PC 3 generally have two situations in which the energy saver mode actually needs to be canceled and does not need to be canceled. The first situation is a printing request from PC 3 and the second is a status monitoring from PC 3. Therefore, multifunctional printer 1 prevents canceling the energy saver mode in case of a status monitoring from PC 3, while securely canceling the mode in case of a printing request from PC 3.

Normally, processing requests from PC 3 are directed to multifunctional printer 1 according to the same step regardless of the actual need of canceling the energy saver mode. In other words, a processing request from PC 3 is given to multifunctional printer 1 by PC 3 writing a desired process (e.g., printing request and status monitoring) (hereafter referred to as write operation), and reading the response from multifunctional printer 1 toward the immediate write operation (hereafter referred to as read operation). Specifically, the processing request from PC 3 is given to multifunctional printer 1 by a series of steps performing the read operation after the write operation. This mode in which PC 3 communicates with multifunctional printer 1 with a series of steps of write and read operations is called a first communication mode.

However, multifunctional printer 1 and connected PC 3 use a step different from the above-mentioned normal series of steps, for requesting a status monitoring from PC 3 during the energy saver mode (hereafter referred to as status monitoring step). Specifically, in the step of status monitoring from PC 3 during the energy saver mode, the write operation is prohibited and only the read operation is performed. A mode in which PC 3 communicates with multifunctional printer 1 only with a read operation is called a second communication mode. A compatibility mode of the IEEE standard can be employed for the first communication mode, and a nibble mode of the same standard can be employed for the second communication mode.

Since the status monitoring and printing request from PC 3 during the energy saver mode are distinguished, it is possible to prevent canceling of the energy saver mode in multifunctional printer 1 because of the status monitoring from PC 3, while securely canceling the energy saver mode according to the printing request from PC 3.

Figure 7:
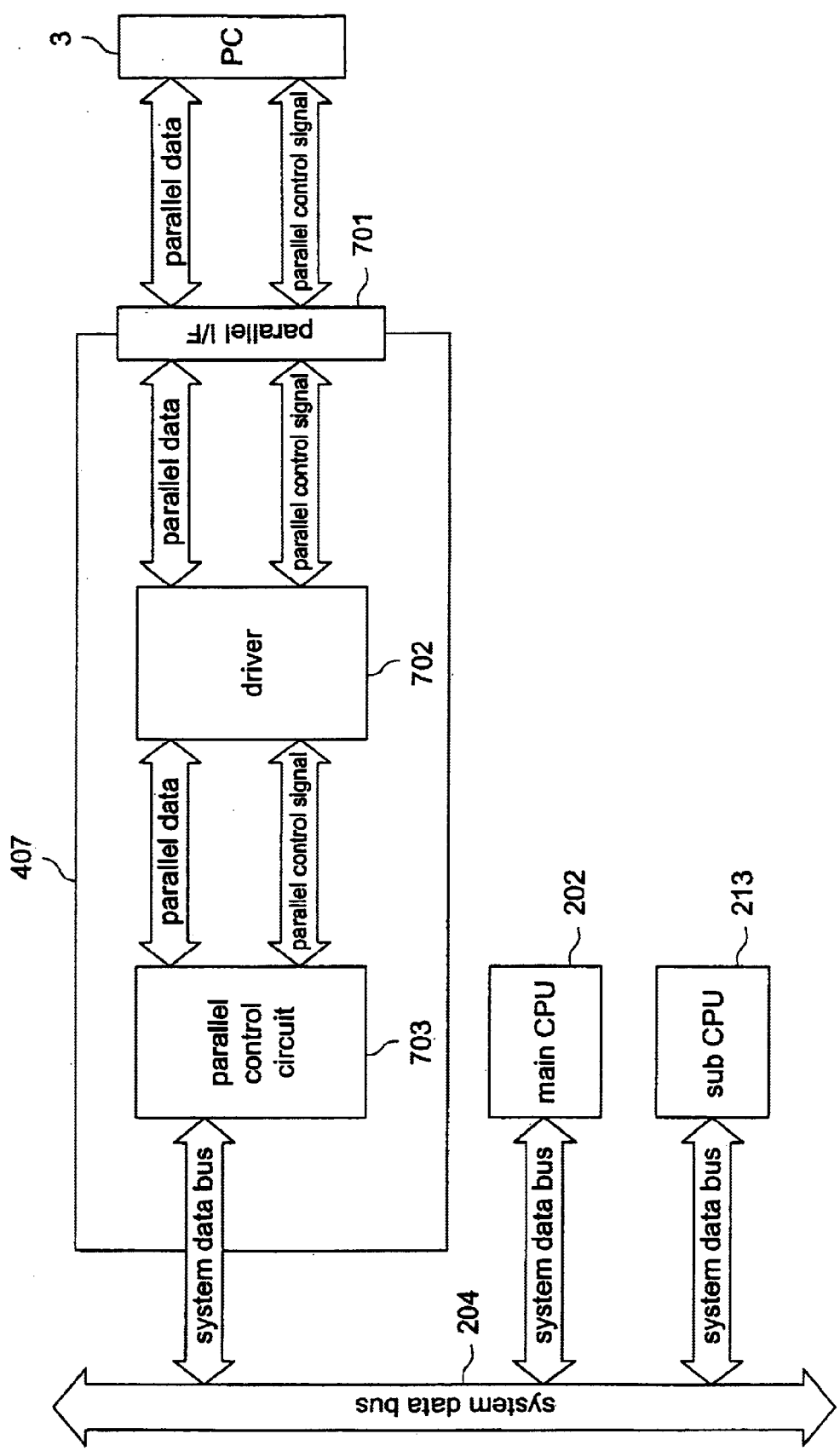
FIG. 7 is a block diagram illustrating a schematic configuration of a PC I/F board of the multifunctional printer according to the first embodiment of the present invention.

The processing request from PC 3 is processed in PC I/F board 407 in FIG. 4. FIG. 7 is a block diagram illustrating a schematic configuration of PC I/F board 407 of multifunctional printer 1.

As shown in the figure, PC I/F board 407 is connected to main CPU 202 and sub CPU 213 via system bus 204. PC I/F board 407 is also connected to PC 3 via parallel interface (I/F) 701 to exchange parallel data and parallel control signal with PC 3.

Parallel data and parallel control signal input via parallel I/F 701 are input to parallel control circuit 703 via driver 702. Driver 702 adjusts levels of electric signals input from PC 3.

Parallel control circuit 703 limits processing requests from PC 3 made to multifunctional printer 1 according to the current mode (energy saver mode/ready mode) of multifunctional printer 1. In particular, the processing request made to multifunctional printer 1 from PC 3 is limited by performing a masking process on predetermined interruption signals, among the interruption signals included in the input parallel data or the like, so that the interruption signal is not output to sub CPU 213.

Hereafter, the interruption signal included in data such as parallel data is illustrated. Parallel data includes a reception interruption signal (RXINT) output when PC 3 performs a write operation with multifunctional printer 1 and a transmission interruption signal (TXINT) output when performing a read operation. Also, a parallel control signal includes a negotiation interruption signal (NEGINT) output when PC 3 negotiates with multifunctional printer 1. Negotiation is performed in a preliminary stage prior to performing the above-described read operation, and information needed between PC 3 and multifunctional printer 1 is exchanged. After completing this negotiation, the read operation is started.

Figure 8:
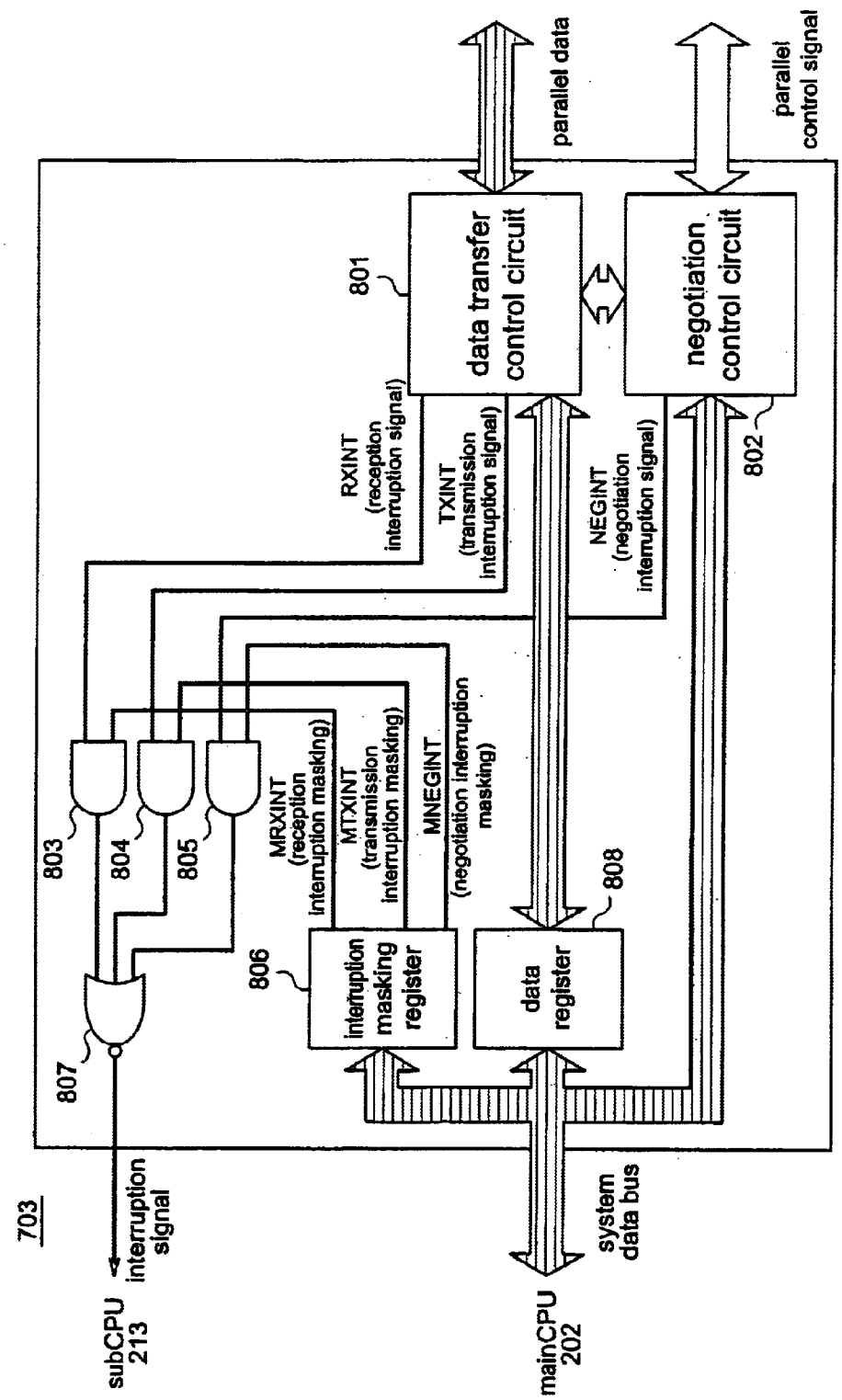
FIG. 8 is a block diagram illustrating a detailed configuration of a parallel control circuit on the PC I/F board of the multifunctional printer according to the first embodiment of the present invention.

FIG. 8 is a block diagram illustrating a detailed configuration of parallel control circuit 703. In FIG. 8, parallel data from driver 702 is input to data transfer control circuit 801. A parallel control signal from driver 702 is input to negotiation control circuit 802.

Data transmission control circuit 801 detects a reception interruption signal (RXINT) and transmission interruption signal (TXINT) included in parallel data, and inputs them into corresponding one of input terminals of determination circuits 803 and 804.

Negotiation control signal 802 detects a negotiation interruption signal (NEGINT) included in the parallel control signal, and inputs them into corresponding one of input terminals of determination circuit 805.

A masking signal for performing a masking process of each interruption signal is input to the other input terminals of determination circuits 803–805 corresponding to each interruption signal. A reception interruption masking signal (MRXINT) for performing a masking process of the reception interruption signal is input to determination circuit 803. Similarly, a transmission interruption masking signal (MTXINT) and negotiation interruption masking signal (MNEGINT) are input to determination circuits 804 and 805 respectively.

These interruption masking signal is input to corresponding determination circuits 803–805 based on the setting of interruption masking register 806. Main CPU 202 sets the interruption masking signal output of interruption masking register 806 according to the current mode of multifunctional printer 1 (energy saver mode or ready mode).

In particular, main CPU 202 sets the output of a transmission interruption masking signal (MTXINT) and negotiation interruption masking signal (MNEGINT) toward interruption masking register 806, when multifunctional printer 1 is in the energy saver mode. This setting is performed immediately before multifunctional printer 1 activates the energy saver mode.

When multifunctional printer 1 is in the ready mode, a setting in which no interruption masking signal is output to interruption masking register 806 is provided. To cancel the energy saver mode, main CPU 202 cancels the setting of the interruption masking register 806.

When a reception interruption signal is input to one of the input terminals and an interruption masking signal is input to the other input terminal in determination circuit 803, the output of the reception interruption signal to determination circuit 807 connected to determination circuit 803 becomes limited. Similarly, output of a transmission interruption signal and negotiation interruption signal from determination circuits 804 and 805 become limited.

If any of the interruption signals is input to determination circuit 807, the interruption signal is output to sub CPU 213 from determination circuit 807. During the energy saver mode, the masking process is performed on a transmission interruption signal (TXINT) and negotiation interruption signal (NEGINT) according to the above-described setting. Accordingly, an interruption signal from determination circuit 807 is output to sub CPU 213 only when a reception interruption signal (RXINT) is input to determination circuit 803.

Main CPU 202 sets codes, in data register 808, that are capable of determining whether multifunctional printer 1 is in the energy saver mode. These codes include an energy saver code indicating that multifunctional printer 1 is in the energy saver mode, and an energy saver cancel mode indicating that multifunctional printer 1 is not in the energy saver mode. The energy saver cancel code is set in the ready mode, and the energy saver code is set during the energy saver mode. In addition, the energy saver code is set immediately before multifunctional printer 1 activates the energy saver mode, and the energy saver cancel code is set immediately after multifunctional printer 1 cancels the energy saver mode.

Data register 808 also temporarily stores printing data or the like delivered from PC 3. The transmission of this printing data is controlled by data transfer control circuit 801.

Next, a sequence of multifunctional printer 1 with the above-described configuration and connected PC 3, in which multifunctional printer 1 activates and cancels the energy saver mode, is illustrated. Cancellation of the energy saver mode is performed because of a request from PC 3, or a request from multifunctional printer 1. The first situation is due to a processing request from PC 3 made to multifunctional printer 1, and the second situation is due to a selection of the energy saver key from operation panel 214 of multifunctional printer 1.

Figure 9:
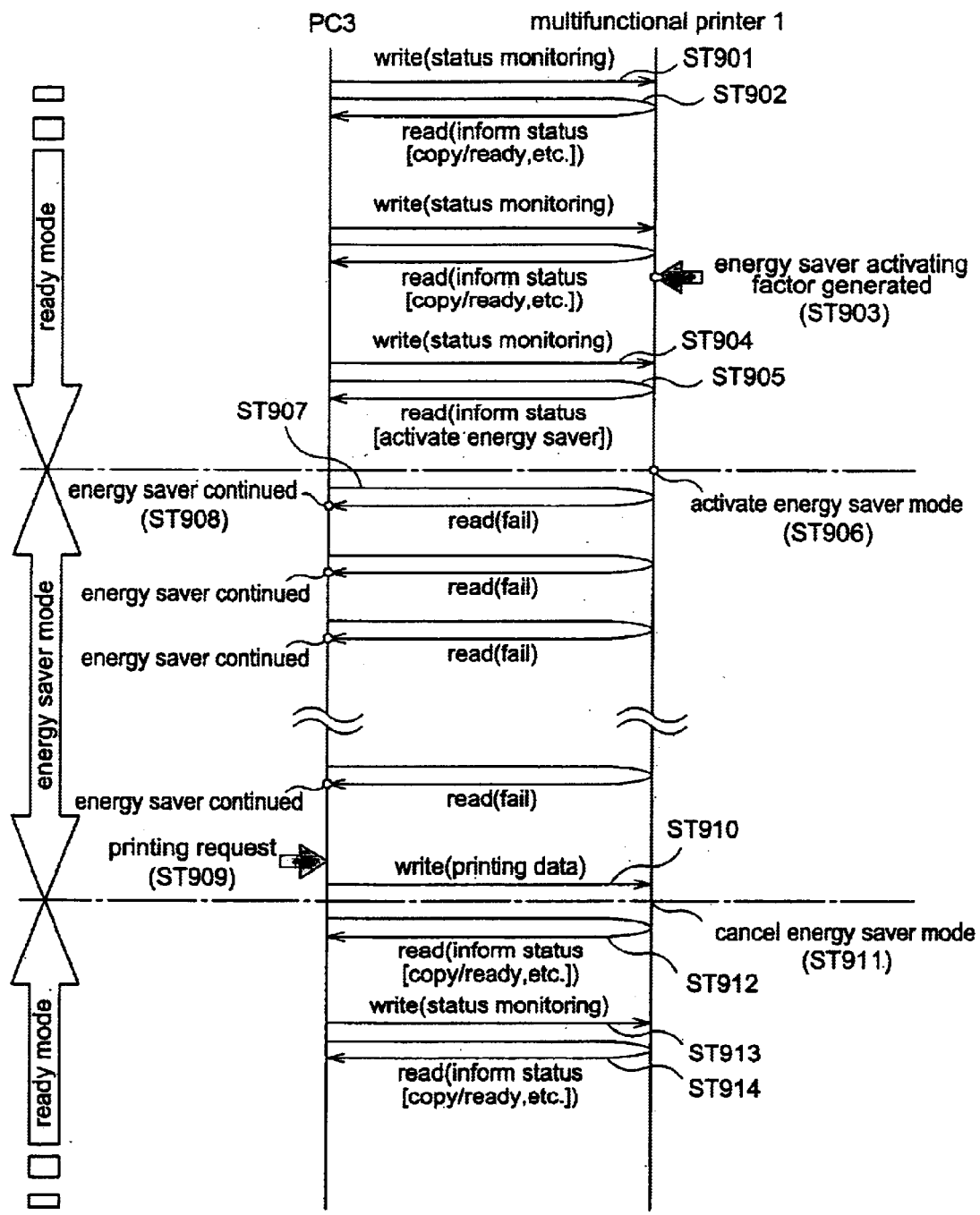
FIG. 9 is a sequence chart illustrating the multifunctional printer of the first embodiment of the present invention canceling the energy saver mode because of a request from a PC after activating the energy saver mode.

First, the situation of canceling the energy saver mode because of the request from PC 3 is illustrated. FIG. 9 is a sequence chart illustrating multifunctional printer 1 canceling the energy saver mode because of a request from PC 3 after activating the energy saver mode. In FIG. 9, the request from PC 3 is a printing request.

As shown in FIG. 9, PC 3 monitors multifunctional printer 1 using the above-described first communication mode in the ready mode. Specifically, PC 3 first performs a write operation on multifunctional printer 1 to make a status monitoring request (ST 901), and secondly performs a read operation to receive the response from multifunctional printer 1 (ST 902). Because of this status monitoring request, PC 3 receives a response, e.g., a message that multifunctional printer 1 is copying or in a ready mode.

After repeating such status monitoring, an energy saver mode activating factor is generated in multifunctional printer 1 (ST 903). For example, the energy saver key is selected from operation panel 214, or the built-in timer of main CPU 202 detects a non-operational state for a predetermined time period in multifunctional printer 1.

When an energy saver mode activating factor is generated, main CPU 202 and sub CPU 213 checks whether it is a factor preventing the energy saver mode activation, and determines whether it is possible to activate the energy saver mode (ST 504–ST 506, ST 509 in FIG. 5). In this example, it is possible to activate the energy saver mode.

When it is possible to activate the energy saver mode, and PC 3 performs a write operation to monitor the status subsequently (ST 904), multifunctional printer 1 returns a response that the energy saver mode will be activated during a succeeding read operation by PC 3 (ST 905).

After responding to PC 3 that the energy saver mode will be activated, multifunctional printer 1 activates the energy saver mode from the ready mode (ST 906). At this time, main CPU 202 sets an interruption masking signal toward interruption masking register 806 in parallel control circuit 703, and the energy saver code for data register 808.

Upon receiving the response that the energy saver mode will be activated, PC 3 recognizes that multifunctional printer 1 is in the energy saver mode. Upon recognizing that multifunctional printer 1 is in the energy saver mode, PC 3 uses the second communication mode to monitor the status of multifunctional printer 1. In other words, PC 3 directly performs a read operation without a write operation (ST 907).

FIG. 8 will be used to illustrate the process of multifunctional printer 1 upon receiving a read operation. Upon activating the energy saver mode at ST 906, main CPU 202 sets interruption masking register 806 so as to output a transmission interruption masking signal and negotiation interruption masking signal. Also, the energy saver code is set in data register 808.

To perform a read operation, PC 3 negotiates with multifunctional printer 1 in the preliminary stage. In particular, PC 3 negotiates with multifunctional printer 1 by outputting a parallel control signal including a negotiation interruption signal to multifunctional printer 1, and by receiving the response from multifunctional printer 1.

In parallel controller 703 in FIG. 8, the parallel control signal including the negotiation interruption signal is input to negotiation control circuit 802. Negotiation control circuit 802 detects the negotiation interruption signal from the parallel control signal and inputs the same in one of the input terminals of determination circuit 805. On the other hand, interruption masking register 806 inputs the negotiation interruption masking signal to the other input terminal of determination circuit 805. Therefore, interruption signal is not output to determination circuit 807 from determination circuit 805. Thus, multifunctional printer 1 does not respond to the negotiation.

Since PC 3 is unable to receive a response from multifunctional printer 1 after performing the negotiation, PC 3 cannot start a read operation. Therefore, the read operation fails as a result. PC 3 is configured so that it interprets a read operation failure during the energy saver mode as a continuation of the energy saver mode in multifunctional printer 1. Therefore, PC 3 determines that multifunctional printer 1 continues to be in the energy saver mode from the read operation failure (ST 908).

When multifunctional printer 1 receives a printing request from PC 3, during the status monitoring using the second communication mode (ST 909), PC 3 performs only read operation and prohibits write operations using the second communication mode, if the operations are just for the status monitoring that does not actually require to cancel the energy saver mode in multifunctional printer 1.

However, for a printing request that actually requires to cancel of the energy saver mode, the first communication mode is used for write and read operations as in the ready mode, even if multifunctional printer 1 is in the energy saver mode. Therefore, when a printing request is made from PC 3, PC 3 performs a write operation on multifunctional printer 1 (ST 910).

The process in multifunctional printer 1 upon receiving this write operation is illustrated using FIG. 8. When PC 3 performs a write operation, parallel data including a reception interruption signal that is output upon performing the write operation are input to data transfer control circuit 801 in parallel control circuit 703 in FIG. 8.

Data transfer control circuit 801 retrieves a reception interruption signal from the parallel data and inputs the same to one of the input terminals of determination circuit 803. At this time, a reception interruption masking signal is not input to the other input terminal of determination circuit 803 from interruption masking register 806. Therefore, a reception interruption signal is input to determination circuit 807 from determination circuit 803. Further, printing data transmitted with the printing request is stored in data register 808 by data transfer control circuit 801.

When the reception interruption signal is input to determination circuit 807, determination circuit 807 outputs the reception interruption signal to sub CPU 213. The reception interruption signal is treated as an energy saver cancel signal by sub CPU 213. Therefore, upon inputting the reception interruption signal, sub CPU 213 starts up main CPU 202 by switching a main power OFF signal to a main power ON signal.

When main CPU 202 is started, the energy saver mode in multifunctional printer 1 is canceled and the ready mode is activated (ST 911). At this time, main CPU 202 cancels the setting of the interruption masking signal of interruption masking register 806 in parallel control circuit 703, and sets an energy saver cancel code in data register 808.

Further, main CPU 202 sends a response that the printing is available in response to the write operation for the printing request at ST 909 (ST 912), reads out printing data stored in data register 808, and executes a printing operation from printer 211.

After reactivating the ready mode, PC 3 monitors the status of multifunctional printer 1 using the first communication mode. In particular, PC 3 performs a write operation on multifunctional printer 1 in order to make a status monitoring request (ST 913), and performs a read operation to receive a response from multifunctional printer 1 (ST 914). Accordingly, the series of operations for canceling the energy saver mode by the request of PC 3 is performed, after multifunctional printer 1 activates the energy saver mode.

Figure 10:
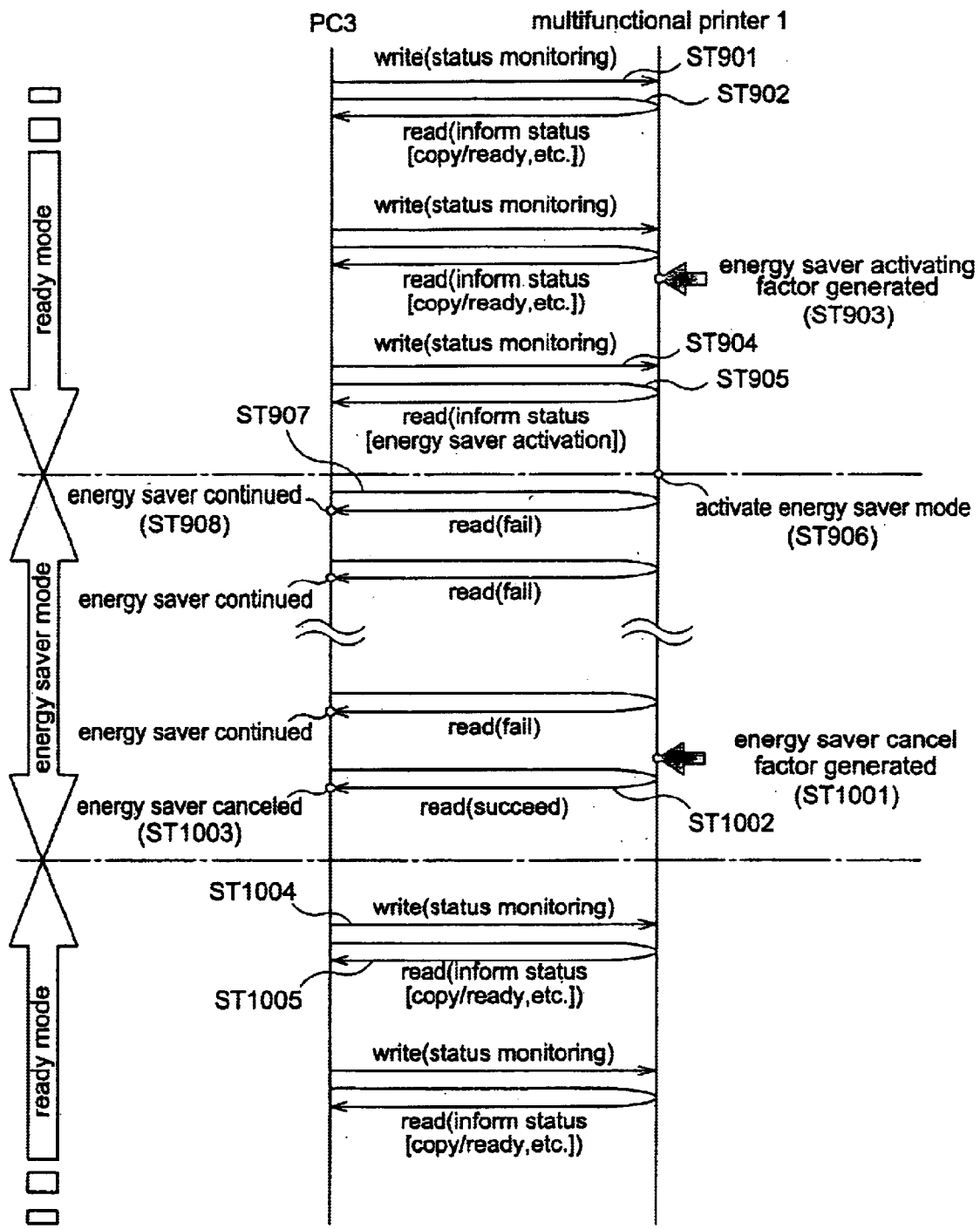
FIG. 10 is a sequence chart illustrating the multifunctional printer of the first embodiment of the present invention canceling the energy saver mode because of a request from the multifunctional printer after activating the energy saver mode.

Next, a situation for canceling the energy saver mode because of a request of multifunctional printer 1 is illustrated. FIG. 10 is a sequence chart illustrating cancellation of the energy saver mode because of a request from multifunctional printer 1 after activating the energy saver mode. Since the operation of ST 901–ST 908 in the sequence of FIG. 10 is the same as FIG. 9, the illustration of the same part is omitted.

As shown in ST 907 and ST 908, multifunctional printer 1 has an energy saver cancel factor generated, while performing the status monitoring using the second communication mode (ST 1001). At this time, main CPU 202 cancels the setting of the interruption masking signal for the interruption masking register 806 in parallel control circuit 703, and sets an energy saver cancel code for data register 808.

At this moment, PC 3 has not recognized that the energy saver cancel factor is generated at multifunctional printer 1. Therefore, PC 3 performs a read operation to monitor the status of multifunctional printer 1 using the second communication mode (ST 1002).

The process that multifunctional printer 1 performs upon receiving this read operation is illustrated using FIG. 8. When performing a read operation, PC 3 negotiates with multifunctional printer 1 by outputting a parallel control signal including a negotiation interruption signal to multifunctional printer 1 in the preliminary stage and receiving a response from multifunctional printer 1 as described above.

The parallel control signal including the negotiation interruption signal is input to negotiation control circuit 802. Negotiation control circuit 802 retrieves the negotiation interruption signal from the parallel control signal and inputs the same into one of the input terminals of determination circuit 805.

At this time, the setting for outputting an interruption masking signal at interruption masking register 806 is already canceled. Therefore, the negotiation interruption masking signal is not input to the other input terminal of determination circuit 805. Thus, the negotiation interruption signal is output to determination circuit 807 from determination circuit 805.

When the negotiation interruption signal is input to determination circuit 807, determination circuit 807 outputs the negotiation interruption signal to sub CPU 213. Although this negotiation interruption signal is treated as the energy saver cancel signal at sub CPU 213, the energy saver cancel signal is already input to sub CPU 213 because of the energy saver cancel factor at ST 1001, and main CPU 202 is started. Sub CPU 213 informs main CPU 202 that the negotiation interruption signal is received. Main CPU 202 responds to the negotiation from PC 3 after receiving this information.

Upon receiving the response toward the negotiation from multifunctional printer 1, PC 3 completes the negotiation and performs a read operation. Parallel data including a transmission interruption signal that is output when performing the read operation is input to data transfer control circuit 801. Data transfer control circuit 801 retrieves the transmission interruption signal from this parallel data and inputs the same to one of the input terminals of determination circuit 804. Similar to the negotiation, the setting for the interruption masking signal output of interruption masking register 806 is already canceled. Therefore, the transmission interruption masking signal is not input to the other input terminal of determination circuit 804. Therefore, the transmission interruption signal is output to determination circuit 807 from determination circuit 804.

When the transmission interruption signal is input to determination circuit 807, determination circuit 807 outputs the transmission interruption signal to sub CPU 213. Although this transmission interruption signal is also treated as the energy saver cancel signal at sub CPU 213, the energy saver cancel signal is already input to sub CPU 213 because of the energy saver cancel factor at ST 1001, and main CPU 202 is started. Therefore, sub CPU 213 informs main CPU 202 that the transmission interruption signal is received.

Upon receiving this notice, main CPU 202 responds to the read operation of PC 3. In response to the read operation, the information that the energy saver mode is canceled is sent. Upon receiving this response, PC 3 recognizes that multifunctional printer 1 has canceled the energy saver mode (ST 1003).

After responding to PC 3 that the energy saver mode is canceled, the energy saver mode is canceled and the ready mode is reactivated at multifunctional printer 1. When the ready mode is reactivated, PC 3 monitors the status of multifunctional printer 1 using the first communication mode. In particular, PC 3 first performs a write operation making a status monitoring request to multifunctional printer 1 (ST 1004), and performs a read operation to receive the response from multifunctional printer 1 (ST 1005). Accordingly, the series of operations for canceling the energy saver mode by the request of multifunctional printer 1 is performed, after multifunctional printer 1 activates the energy saver mode.

Next, the operations of multifunctional printer 1 and connecting PC 3 in the sequences of FIGS. 9 and 10 are illustrated.

Figure 11:
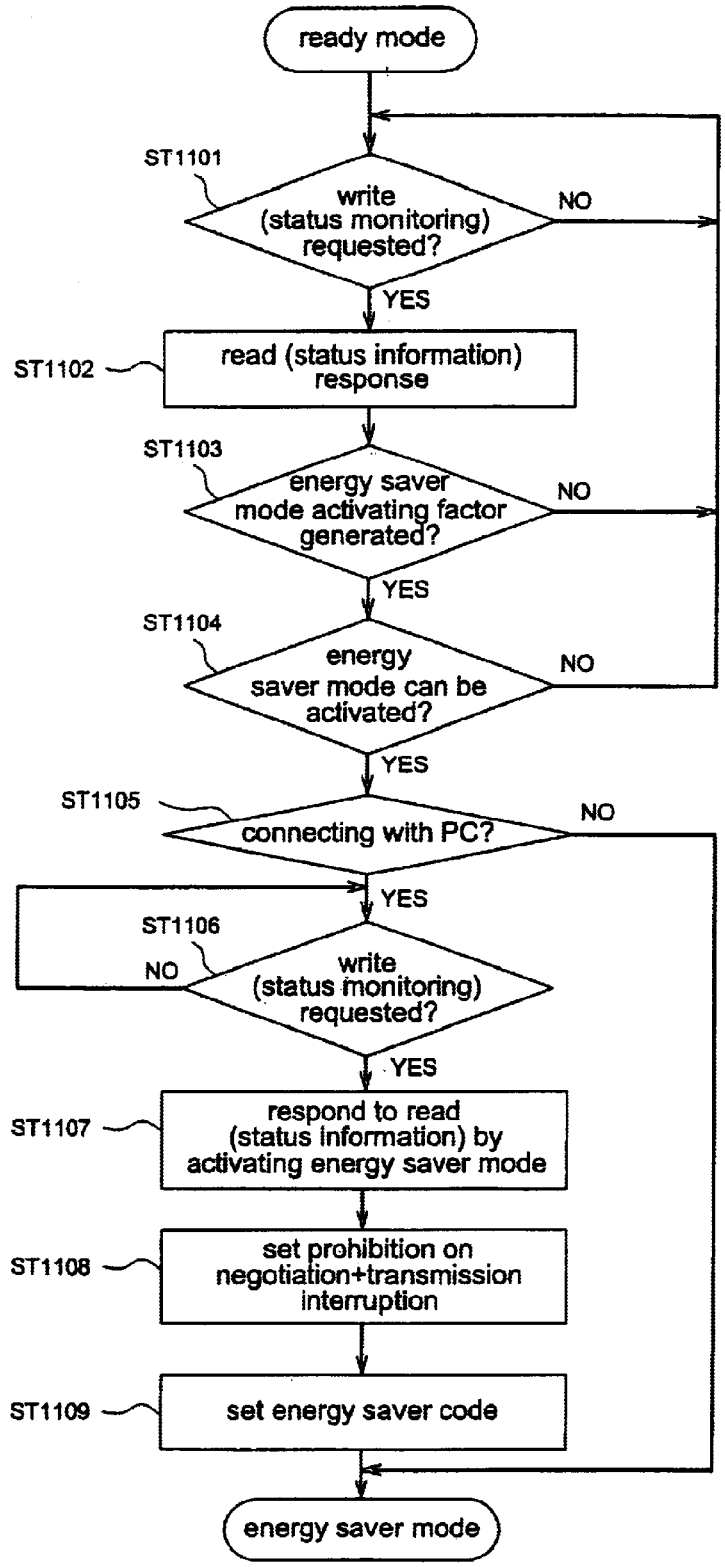
FIG. 11 is a flowchart illustrating an operation of the multifunctional printer of the first embodiment when the energy saver mode is activated from the ready mode.
Figure 12:
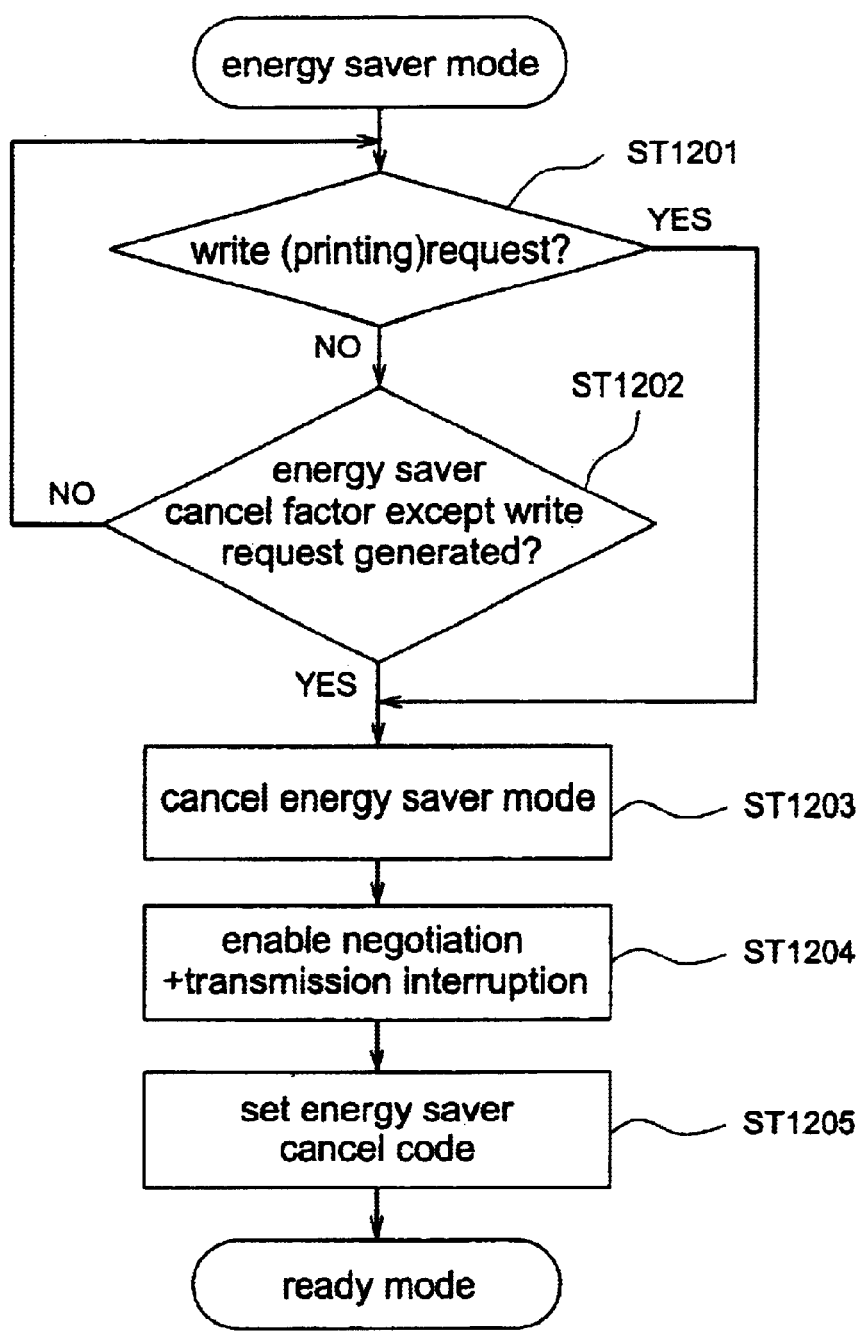
FIG. 12 is a flowchart illustrating an operation of the multifunctional printer of the first embodiment when the ready mode is activated from the energy saver mode.

First, the operation of multifunctional printer 1 is illustrated. FIG. 11 is a flowchart illustrating an operation of multifunctional printer 1 when the energy saver mode is activated from the ready mode. FIG. 12 is a flowchart illustrating an operation of multifunctional printer 1 when the ready mode is activated from the energy saver mode.

When multifunctional printer 1 is currently in the ready mode, multifunctional printer 1 monitors whether a request is made for a write operation from PC 3 (hereafter referred to as write request) (ST 1101). In this example, a write request is made to monitor the status of multifunctional printer 1. In particular, this is a write request shown in ST 901 and ST 913 of FIGS. 9 and 10. In the ready mode, main CPU 202 is running, thus, main CPU 202 monitors the write request.

When a write request is made for the status monitoring, main CPU 202 checks the status of multifunctional printer 1, and responds to a read operation requested from PC 3 (hereafter referred to as read response) after the write operation (ST 1102). In particular, this is a read response shown in ST 902 and ST 914 of FIGS. 9 and 10.

During the repeated exchanges of write requests from PC 3 and read responses as in ST 1101 and ST 1102, main CPU 202 monitors whether an energy saver mode activating factor is generated (ST 1103). In particular, main CPU 202 monitors whether sub CPU 213 informs that the energy saver key is selected, or the built-in timer detects a non-operational state for a predetermined time period at multifunctional printer 1. The generated energy saver mode activating factor is the same as in ST 903 of FIGS. 9 and 10.

When an energy saver mode activating factor is generated, main CPU 202 confirms whether there are factors preventing the activation of the energy saver mode and determines whether the energy saver mode can be activated, by checking with sub CPU 213 (ST 1104). In this example, main CPU 202 determines that the energy saver mode can be activated.

If no write request is made from PC 3 at ST 1101, the energy saver mode activating factor is not generated at ST 1103, or the energy saver mode cannot be activated at ST 1104, main CPU 202 repeats the process of ST 1101–ST 1104.

Upon confirming that the energy saver mode can be activated at ST 1104, main CPU 202 checks the existence of PC 3 connected to multifunctional printer 1 (ST 1105). This is considering a situation in which the power for PC 3 is later shut down. When PC 3 is not connected to multifunctional printer 1, main CPU 202 directly activates the energy saver mode for multifunctional printer 1.

When the existence of PC 3 connected to multifunctional printer 1 is confirmed, main CPU 202 again waits for a write request for the status monitoring from PC 3 (ST 1106). This is the write request shown in ST 904 of FIGS. 9 and 10.

Upon receiving the write request for the status monitoring at ST 1106, main CPU 202 checks the status of multifunctional printer 1, and responds to a read operation requested from PC 3 after the write operation (ST 1107).

Since the energy saver mode activating factor is generated and it is determined that multifunctional printer 1 can activate the energy saver mode, main CPU 202 responds that the energy saver mode will be activated in response to the read operation. This is the read response shown in ST 905 of FIGS. 9 and 10.

After responding to PC 3 that the energy saver mode will be activated, main CPU 202 sets a prohibition on the negotiation interruption and transmission interruption from PC 3 (ST 1108). In particular, main CPU 202 sets the output of a negotiation interruption masking signal and transmission interruption masking signal toward interruption masking register 806 in parallel control circuit 703, in order to prohibit the negotiation interruption and transmission interruption from PC 3.

Simultaneously, main CPU 202 sets the energy saver code for data register 808 in parallel control circuit 703 (ST 1109). Main CPU 202 activates the energy saver mode from the ready mode in multifunctional printer 1. This is an equivalent of ST 906 of FIGS. 9 and 10. The activation of energy saver mode from the ready mode in multifunctional printer 1 is performed in accordance with the steps illustrated in FIG. 4 between main CPU 202 and sub CPU 213.

When multifunctional printer 1 is currently in the energy saver mode, energy saver cancel factors are monitored in multifunctional printer 1 as shown in FIG. 12. Factors that can be the energy saver mode cancel factors during the energy saver mode are a write request from PC 3 and energy saver key selection from operation panel 214. Since main CPU 202 is not operated during the energy saver mode, sub CPU 213 monitors energy saver mode cancel factors.

In particular, sub CPU 213 monitors whether PC 3 is making a write request (ST 1201). Specifically, sub CPU 213 monitors by determining whether a reception interruption signal is input from determination circuit 807 in parallel control circuit 703 as illustrated in FIG. 8. The write request monitored here is the same as the write request for printing request shown in ST 910 of FIG. 9.

If no write request is made from PC 3, sub CPU 213 monitors the energy saver mode cancel factors except the write requests (ST 1202). In particular, sub CPU 213 monitors whether the energy saver cancel factors illustrated in FIG. 2, including the energy saver key selection at operation panel 214, are reported to sub CPU 213. These energy saver cancel factors monitored here the same as the energy saver cancel factors illustrated in ST 1001 of FIG. 10.

If an energy saver cancel factor is not detected either in ST 1201 or ST 1202, sub CPU 213 repeats the processes of ST 1201 and ST 1202.

If an energy saver cancel factor is detected, on the other hand, at either ST1201 or ST 1202, sub CPU 213 cancels the energy saver mode (ST 1203). The cancellation of energy saver mode of multifunctional printer 1 is performed between main CPU 202 and sub CPU 213 in accordance with the steps illustrated in FIG. 4. Accordingly, main CPU 202 is started from the non-operational state.

When main CPU 202 is started, it enables the negotiation interruption and transmission interruption from PC 3 (ST 1204). In particular, main CPU 202 cancels the prohibition of the negotiation interruption and transmission interruption from PC 3 at interruption masking register 806 in parallel control circuit 703, and enables the negotiation interruption and transmission interruption from PC 3.

At the same time, main CPU 202 sets an energy saver cancel code at data register 808 in parallel control circuit 703 (ST 1205), and activates the ready mode from the energy saver mode in multifunctional printer 1. Accordingly, the operation of multifunctional printer 1 of the sequence shown in FIGS. 9 and 10 is performed.

Figure 13:
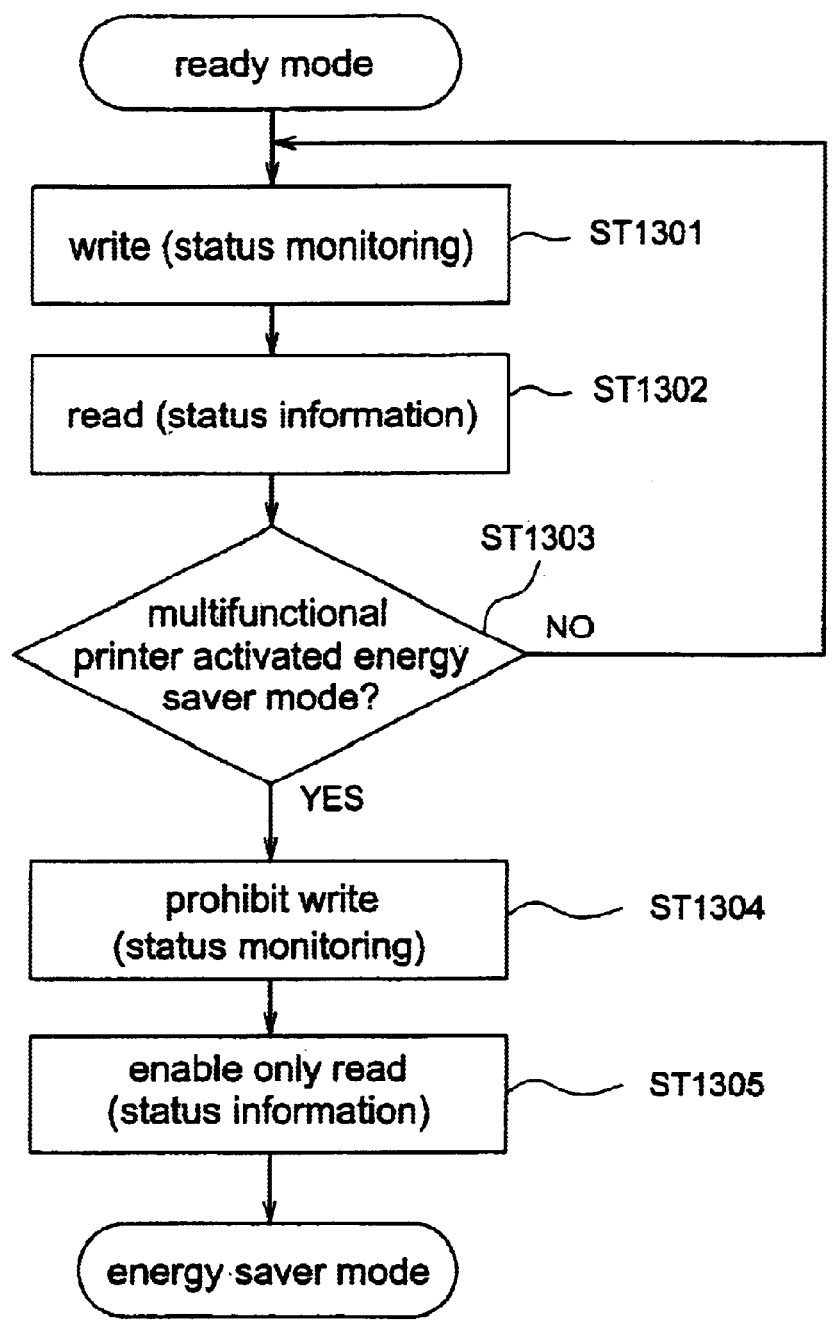
FIG. 13 is a flowchart illustrating an operation of the PC when the multifunctional printer of the first embodiment activates the energy saver mode from the ready mode.
Figure 14:
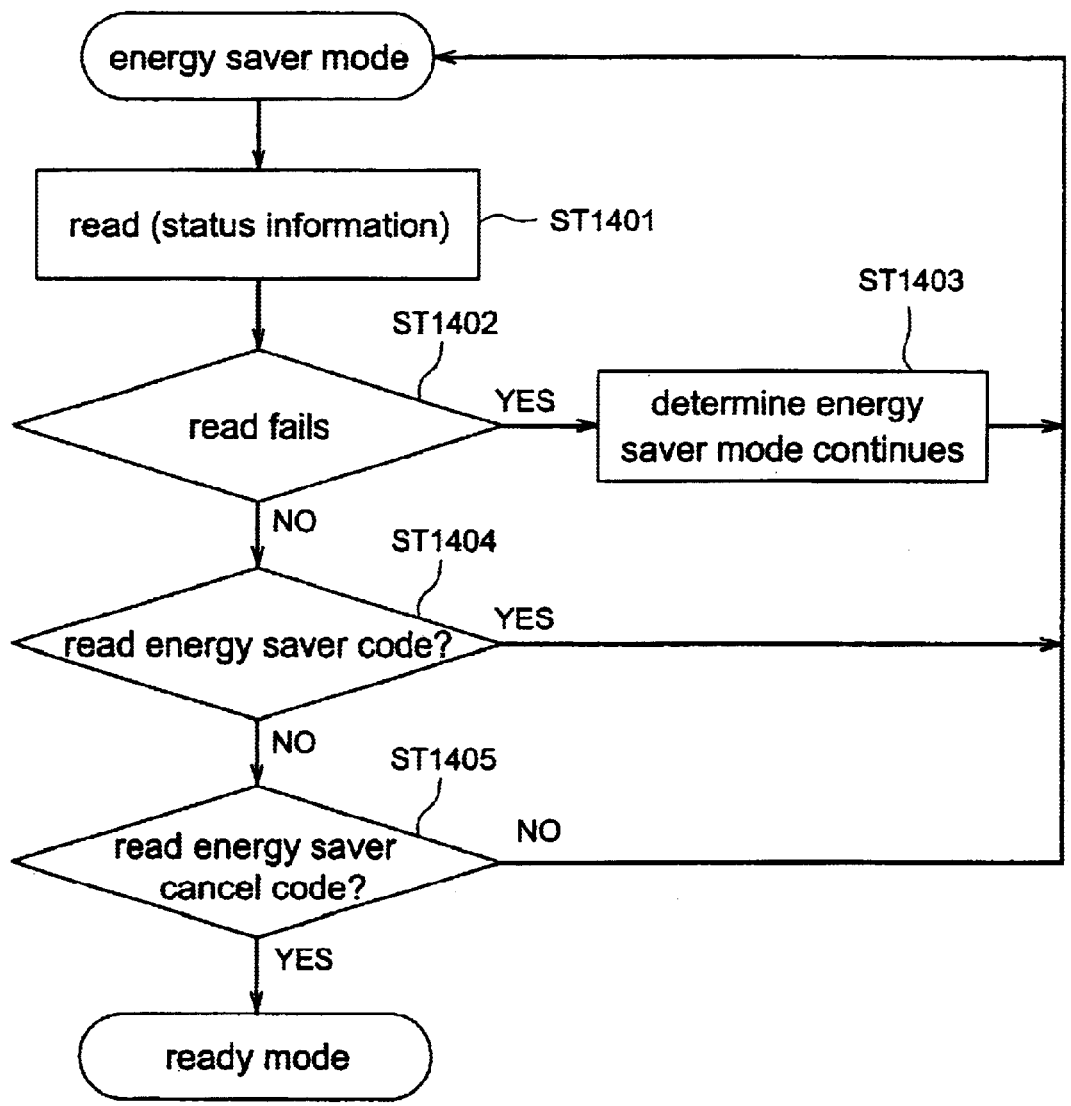
FIG. 14 is a flowchart illustrating an operation of the PC when the multifunctional printer of the first embodiment activates the ready mode from the energy saver mode.

Next, an operation of PC 3 connected to multifunctional printer 1 is illustrated. FIG. 13 is a flowchart illustrating the operation of PC 3 when multifunctional printer 1 activates the energy saver mode from the ready mode. FIG. 14 is a flowchart illustrating an operation of PC 3 when multifunctional printer 1 activates the ready mode from the energy saver mode.

When multifunctional printer 1 is currently in the ready mode, PC 3 monitors the status of multifunctional printer 1 using the first communication mode. In particular, PC 3 performs a write operation making a status monitoring request to multifunctional printer 1 (ST 1301). This is the same write operation shown in ST 901 and ST 913 of FIGS. 9 and 10. After performing the write operation, PC 3 performs a read operation for multifunctional printer 1 in order to receive a response (ST 1302). This is the same read operation shown in ST 902 and ST 914 of FIGS. 9 and 10.

Upon receiving the response to the status monitoring request from multifunctional printer 1, PC 3 determines whether the information that multifunctional printer 1 will activate the energy saver mode is included in the response (ST 1303). If the information is not included, PC 3 repeats the process of ST 1301–ST 1303.

When the information for activating the energy saver mode is included, PC 3 recognizes that multifunctional printer 1 has activated the energy saver mode. Upon recognizing the activation of energy saver mode, PC 3 switches its mode to a second communication mode to monitor the status of multifunctional printer 1.

In particular, PC 3 prohibits write operations to monitor the status of multifunctional printer 1 (ST 1304), and performs only a read operation to perform the status monitoring (ST 1305). At this time, PC 3 treats the read operation failure in the second communication mode as a continuation of the energy saver mode in multifunctional printer 1.

When multifunctional printer 1 activates the energy saver mode, PC 3 monitors the status of multifunctional printer 1 using the second communication mode as shown in FIG. 14. Specifically, PC 3 monitors the status of multifunctional printer 1 only with a read operation (ST 1401). This is the same as the read operation shown in ST 907 of FIGS. 9 and 10.

When performing the read operation at ST 1401, there is a need to negotiate with multifunctional printer 1 in the preliminary stage. Therefore, PC 3 tries to negotiate with multifunctional printer 1. However, when multifunctional printer 1 is in the energy saver mode, the negotiation interruption and transmission interruption from PC 3 are prohibited by multifunctional printer 1. Therefore, multifunctional printer 1 does not respond to the negotiation request from PC 3, and the negotiation will not be completed. Therefore, the read operation will not be activated thus the read operation from PC 3 fails.

After performing the read operation on multifunctional printer 1 at ST 1401, PC 3 determines whether the read operation fails (ST 1402). As described above, when multifunctional printer 1 is in the energy saver mode, the read operation fails.

The failure of the read operation at ST 1401 is treated by PC 3 as a continuation of the energy saver mode in multifunctional printer 1 (ST 1403). This is the same determination as shown at ST 908 of FIGS. 9 and 10.

There are situations in which a read operation succeeds in the determination of ST 1402. In particular, a read operation succeeds when an energy saver cancel factor is generated at multifunctional printer 1 as illustrated at ST 1001 of FIG. 10. When an energy saver cancel factor is generated, multifunctional printer 1 cancels the prohibition of the negotiation interruption and transmission interruption from PC 3.

In this case, there is no limitation as described above, the negotiation from PC 3 is completed, and a read operation is performed. In response to the read operation, multifunctional printer 1 responds that the energy saver mode is canceled.

Together with the determination of the read operation failure at ST 1402, PC 3 checks whether the energy saver code and energy saver cancel code set in multifunctional printer 1 are read (ST 1404 and ST 1405). In this embodiment, PC 3 does not normally read the energy saver code or the like set in multifunctional printer 1. However, abnormal situations in which the energy saver code is read are taken into considerations at ST 1404 and ST1405.

When the energy saver code is read at ST 1404, the energy saver code is not read at ST 1404, and energy saver cancel code is not read at ST 1405, PC 3 moves the process back to ST 1401 and repeats the above process. If the energy saver code is read at ST 1405, PC 3 recognizes that the ready mode is reactivated from the energy saver mode in multifunctional printer 1. Upon recognizing that the ready mode is reactivated, PC 3 starts monitoring the status of multifunctional printer 1 with the first communication mode, and performs the process according to the illustration of FIG. 13.

As explained above, multifunctional printer 1 of the present embodiment is provided with a separate sub CPU 213 as an energy saver controller detecting the energy saver cancel factors and controlling the power supply to main CPU 202, and sub power 402 installed for sub CPU 213. Since sub CPU 213 with lower power consumption is used to monitor the energy saver cancel factors during the energy saver mode, it is possible to shut down the power supply to main CPU 202 and minimize the power consumption during the energy saver mode.

Also, even in a situation in which multifunctional printer 1 functions as a printer for PC 3, PC I/F board 407 as an interface unit with PC 3 is separately provided so that sub CPU 213 is informed with a printing request from PC 3 as an energy saver cancel factor, and sub power 402 supplies the power to PC I/F board 407. Accordingly, even if the power supply to main CPU 202, which has larger power consumption, is shut off during the energy saver mode, the printing request from PC 3 is detected and the power supply to the main CPU 202 can be restored. Therefore, it is possible for multifunctional printer 1 to function as a printer for PC 3, while minimizing the power consumption during the energy saver mode.

Further, in multifunctional printer 1 according to the present embodiment, main CPU 202 prohibits informing sub CPU 213 when PC I/F board 407 receives an access from PC 3 with the second communication mode performing only a read operation when activating the energy saver mode. Therefore, as long as PC 3 accesses with the second communication mode, the energy saver mode cannot be canceled. Thus, even PC 3 accesses to monitor the status during the energy saver mode, the energy saver mode is not canceled every time. Accordingly, it is possible to minimize the power consumption during the energy saver mode and prevent the system from impairing the energy saver mode in a multifunctional printer functioning as printer for a PC.

Also, as long as PC 3 access with the second communication mode during the energy saver mode, main CPU 202 is not started thus unable to respond to PC 3. However, PC 3 is configured so as to determine that multifunctional printer 1 is in the energy saver mode when there is no response during the energy saver mode. Therefore, PC 3 can determine that multifunctional printer 1 is in the energy saver mode without starting main CPU 202 at multifunctional printer 1. Thus, it is possible to minimize the power consumption during the energy saver mode, enable the status monitoring function of PC 3, and prevent the system from impairing the energy saver mode in a multifunctional printer functioning as printer for a PC.

Furthermore, in multifunctional printer 1 according to the present embodiment, main CPU 202 cancels the prohibition of informing sub CPU 213 when PC I/F board 407 receives an access from PC 3 with the second communication mode performing only a read operation when the energy saver mode is canceled. Therefore, in the ready mode, PC I/F board 407 informs main CPU 202 via sub CPU 213 of even an access from PC 3 with the second communication mode, and normal communication is performed between PC 3 and multifunctional printer 1. Therefore, it is possible to prevent limiting the communication mode between PC 3 and multifunctional printer 1 having the energy saver mode.

Further, in multifunctional printer 1 of the present embodiment, PC I/F board 407 informs sub CPU 213 when accessed by PC 3 with the second communication mode performing only a read operation in the ready mode, while PC I/F board 407 does not informing sub CPU 213 when accessed by PC 3 with the second communication mode during the energy saver mode. Therefore, by configuring PC 3 so as to monitor the status of multifunctional printer 1 using the second communication mode performing only a read operation during the energy saver mode, it is possible to prevent activating the ready mode even if a read command is detected at multifunctional printer 1. Therefore, it is possible to minimize the power consumption during the energy saver mode, enable the status monitoring function of a PC, and prevent the system from impairing the energy saver mode in a multifunctional printer functioning as printer for a PC.

Further, in multifunctional printer 1 of the present embodiment, PC I/F board 407 informs sub CPU 213 when accessed by PC 3 with the first communication mode performing a write operation during the energy saver mode, while not informing the energy saver controller when accessed by PC 3 with the second communication mode with only a read operation. Therefore, by configuring PC 3 so as to monitor the status of multifunctional printer 1 using the second communication mode performing only a read operation during the energy saver mode, it is possible to prevent activating the ready mode even if a read command is detected at multifunctional printer 1. Therefore, it is possible to minimize the power consumption during the energy saver mode, enable the status monitoring function of a PC, and prevent the system from impairing the energy saver mode in multifunctional printer 1 functioning as printer for PC 3.

Furthermore, the printing request from PC 3 is performed with the first communication mode. Therefore, when accessed with the first communication mode during the energy saver mode, the ready mode is reactivated, while when accessed with the second communication mode, the ready mode is not reactivated. Thus, by having the configuration in PC 3 that uses the first communication mode for a printing request during the energy saver mode, and that uses the second communication mode for a status monitoring, multifunctional printer 1 can determine whether to activate the ready mode based on whether a write command is detected. Therefore, it is possible to minimize the power consumption during the energy saver mode, maintain the function as a printer for PC 3 during the energy saver mode, enable the status monitoring function of a PC, and prevent the system from impairing the energy saver mode.

According to PC 3 connected to multifunctional printer 1 of the present embodiment, when multifunctional printer 1 is in the ready mode, PC 3 periodically accesses and monitors the status of multifunctional printer 1 with the first communication mode performing both write and read operations on multifunctional printer 1. However, when multifunctional printer 1 is in the energy saver mode, PC 3 periodically accesses and monitors the status of multifunctional printer 1 with the second communication mode performing only a read operation. By configuring multifunctional printer 1 so as to not reactivate the ready mode when a read command is detected during the energy saver mode, multifunctional printer 1 will not reactivate the ready mode even if PC 3 accesses for status monitoring. Therefore, it is possible to enable the status monitoring function of PC 3 and prevent the system from impairing the energy saver mode in multifunctional printer 1 functioning as printer for PC 3.

Also, when multifunctional printer 1 is in the energy saver mode, PC 3 monitors the status of multifunctional printer 1 by periodically accessing with the second communication mode performing only a read operation. Therefore, even though multifunctional printer 1 detects a read command, main CPU 202 is in a non-active state thus sends no response to PC 3. However, by configuring PC 3 so as to determine no response during the energy saver mode as a continuation of the energy saver mode, PC 3 can determine that multifunctional printer 1 is in the energy saver mode, without having multifunctional printer 1 communicate with PC 3 during the energy saver mode. Therefore, it is possible to minimize the power consumption during the energy saver mode, enable the status monitoring function of a PC, and prevent the system from impairing the energy saver mode in multifunctional printer 1 functioning as printer for PC 3.

Further, PC 3 connected to multifunctional printer 1 of the present embodiment determines that multifunctional printer 1 is in the energy saver mode when the multifunctional printer is in the energy saver mode and there is no response to PC's status monitoring access. However, PC 3 determines that multifunctional printer 1 have canceled the energy saver mode when there is a response. Therefore, it is possible for PC 3 to determine that multifunctional printer 1 is in the energy saver mode without having multifunctional printer 1 communicate with PC 3 during the energy saver mode. Therefore, it is possible to minimize the power consumption during the energy saver mode, enable the status monitoring function of a PC, and prevent the system from impairing the energy saver mode in a multifunctional printer functioning as printer for a PC.

Second Embodiment

In multifunctional printer 1 according to the first embodiment, parallel control circuit 703 on PC I/F board 407 performs a masking process on the negotiation interruption signal and transmission interruption signal in order to limit a read operation from PC 3 during the energy saver mode. In multifunctional printer 1 according to the second embodiment, unlike the first embodiment, parallel control circuit 703 automatically responds to the negotiation from PC 3 and informs whether multifunctional printer 1 is in the energy saver mode.

Additionally, PC 3 connected to multifunctional printer 1 according to the first embodiment regards the failure in a read operation with multifunctional printer 1 as a continuation of the energy saver mode in multifunctional printer 1. However, PC 3 connected to multifunctional printer 1 according to the second embodiment determines whether multifunctional printer 1 is in the energy saver mode based on a response of multifunctional printer 1 to the negotiation.

Figure 15:
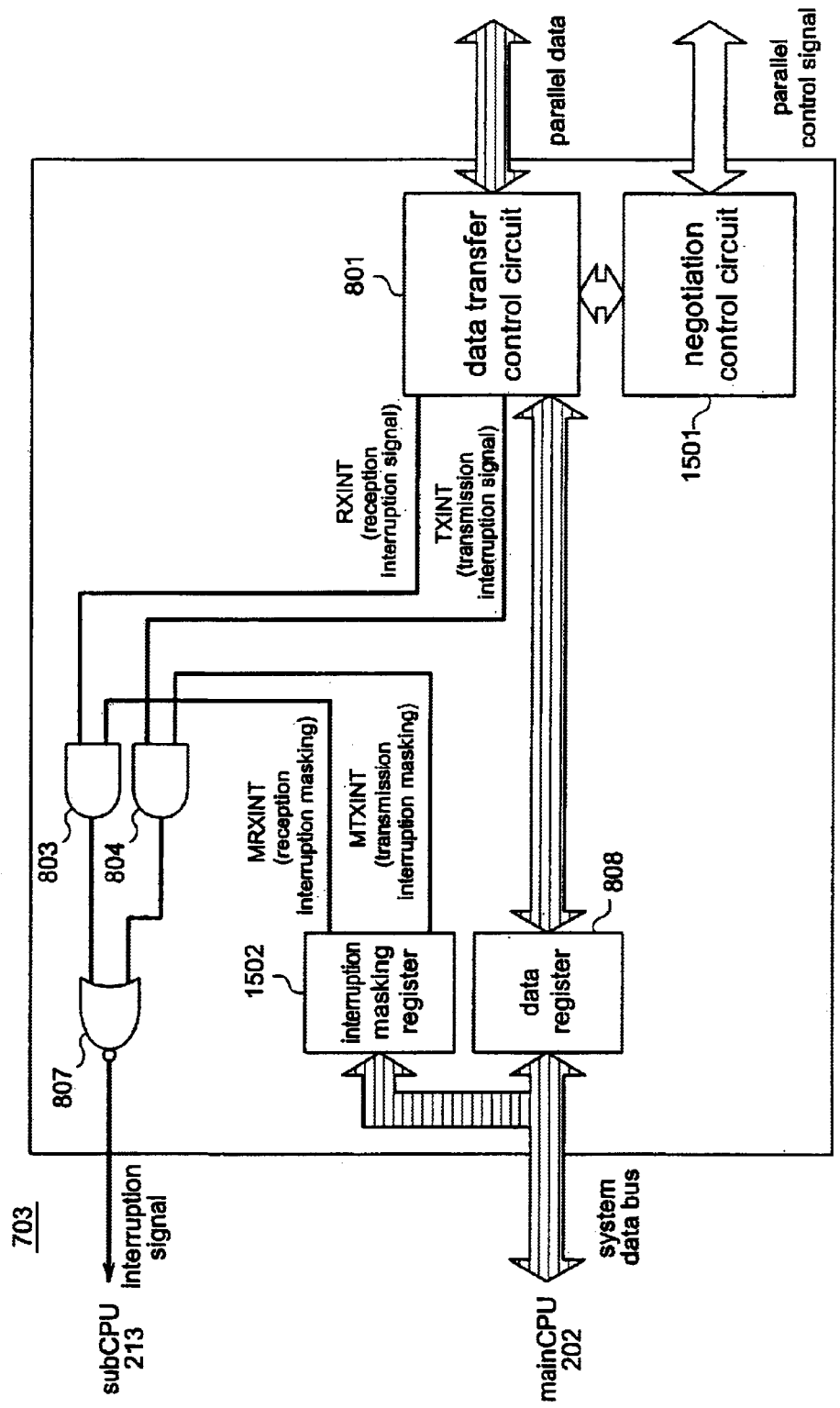
FIG. 15 is a block chart illustrating a detailed configuration of a parallel control circuit on the PC I/F board of the multifunctional printer according to the second embodiment of the present invention.

FIG. 15 is a block chart illustrating a detailed configuration of parallel control circuit 703 on PC I/F board 407 of multifunctional printer 1 according to the second embodiment of the present invention. Multifunctional printer 1 according to the second embodiment has the same configuration as multifunctional printer 1 of the first embodiment except the configuration of parallel control circuit 703 on PC I/F board 407 shown in FIG. 15. In FIG. 15, configurations having the same numerical characters as in FIG. 8 are provided with the same functions as in FIG. 8.

In parallel control circuit 703 in multifunctional printer 1 of the second embodiment, negotiation control circuit 1501 has a function to automatically respond to the negotiation from PC 3 and to inform whether multifunctional printer 1 is in the energy saver mode or ready mode. At that time, negotiation control circuit 1501 responds to the negotiation based on the energy saver code set in data register 808 by main CPU 202 (energy saver cancel code).

In particular, when the energy saver code is set in data register 808 by main CPU 202, negotiation control circuit 1501 responds to PC 3 that multifunctional printer 1 is in the energy saver mode during a negotiation. When the energy saver cancel code is set in data register 808 on the other hand, negotiation control circuit 1501 responds to PC 3 that multifunctional printer 1 is in the ready mode during a negotiation.

Interruption masking register 1502 sets an interruption masking signal to be output from main CPU 202. Main CPU 202 sets the output of the interruption masking signal in interruption masking register 1502 according to the current mode in multifunctional printer 1 (i.e., energy saver mode or ready mode).

In particular, when multifunctional printer 1 is in the energy saver mode, main CPU 202 sets the output of a transmission interruption masking signal (MTXINT) to interruption masking register 1502. This setting is performed immediately before the activation of the energy saver mode by multifunctional printer 1.

If multifunctional printer 1 is in the ready mode, main CPU 202 does not allow the output of any interruption masking signals to interruption masking register 1502. In order to cancel the energy saver mode, main CPU 202 cancels the setting of interruption masking register 1502.

Next, a sequence of multifunctional printer 1 activating the energy saver mode and canceling the same between multifunctional printer 1 and connected PC 3 of the second embodiment is illustrated, in comparison with the sequence of multifunctional printer 1 according to the first embodiment (FIG. 9).

Figure 16:
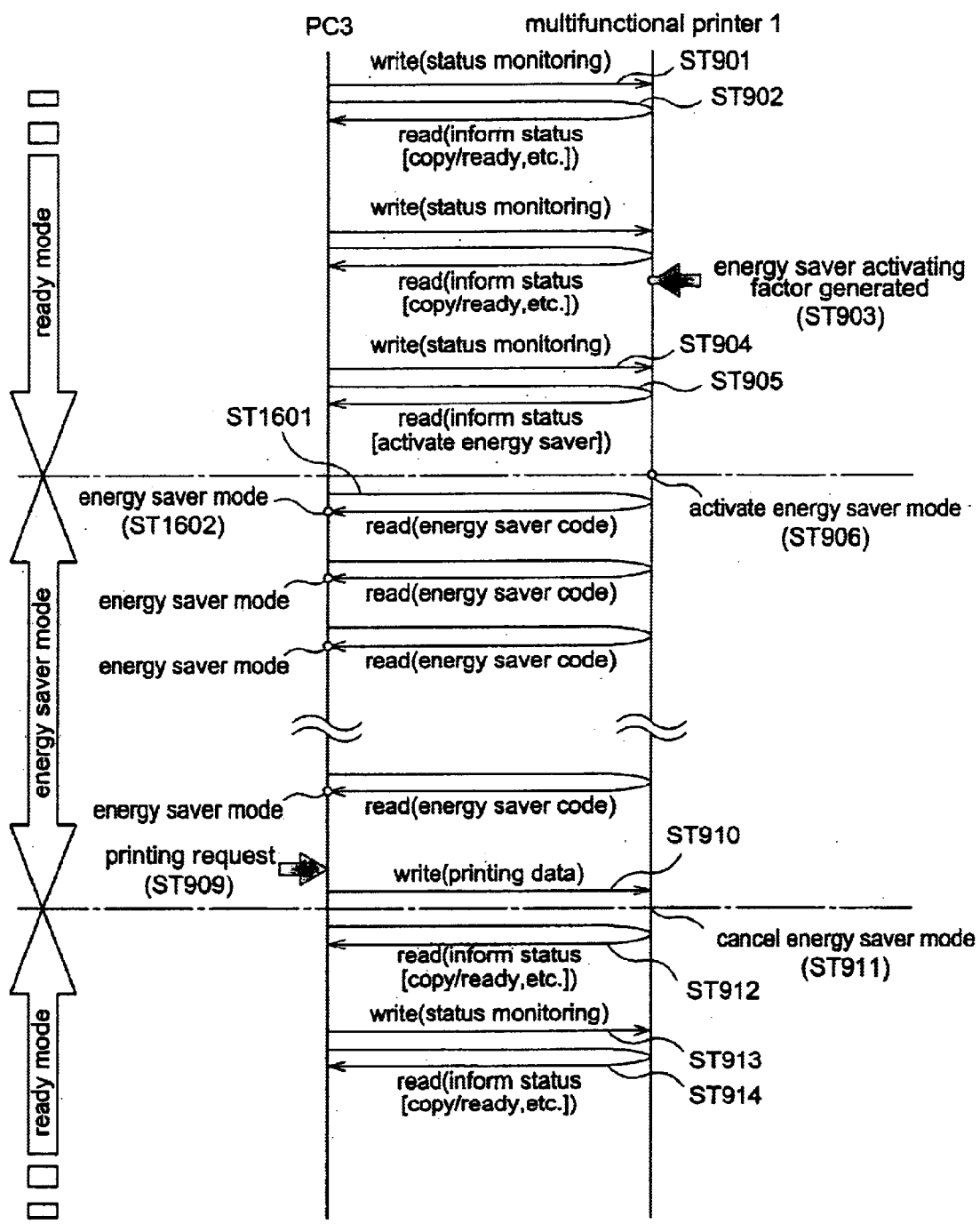
FIG. 16 is a sequence chart illustrating the multifunctional printer according to the second embodiment canceling the energy saver mode because of a request from a PC after activating the energy saver mode.
Figure 17:
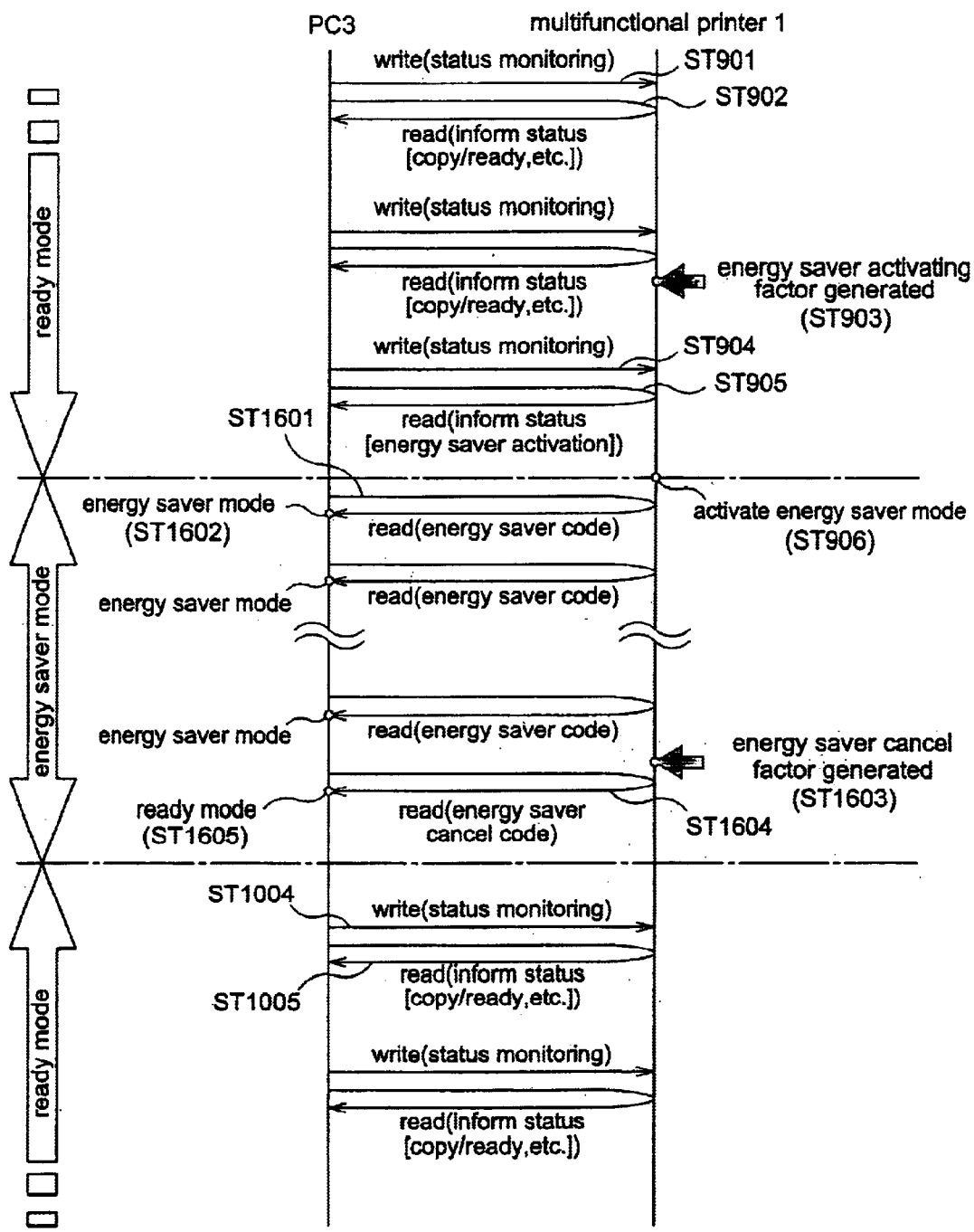
FIG. 17 is a sequence chart illustrating the multifunctional printer according to the second embodiment canceling the energy saver mode because of a request from the multifunctional printer after activating the energy saver mode.

FIG. 16 is a sequence chart illustrating multifunctional printer 1 according to the second embodiment canceling the energy saver mode because of a request from PC 3 after activating the energy saver mode. FIG. 17 is a sequence chart illustrating cancellation of the energy saver mode because of a request from multifunctional printer 1 after activating the energy saver mode. In both FIGS. 16 and 17, parts having the same numerical characters as in FIGS. 9 and 10 perform the same processes as in FIGS. 9 and 10.

For activating the energy saver mode from PC 3's request, the status monitoring in the ready mode between multifunctional printer 1 and connecting PC 3 of the second embodiment is the same as in the first embodiment shown in FIG. 16. Specifically, the process is performed according to the sequence of ST 901–ST 906 in FIG. 16.

Next, the process of multifunctional printer 1 and PC 3 when the energy saver mode is activated at ST 906 is illustrated. Similar to the first embodiment, when activating the energy saver mode, main CPU 202 sets an interruption masking signal for interruption masking register 1502 in parallel control circuit 703, and sets an energy saver code for data register 808. In the first embodiment, the output setting for the negotiation interruption masking signal and transmission interruption masking signal are performed. However, in the second embodiment, the output setting only for the transmission interruption masking signal is performed.

Upon receiving the response for activating the energy saver mode, PC 3 recognizes that multifunctional printer 1 has activated the energy saver mode, and monitors the status of multifunctional printer 1 with the second communication mode, similar to the first embodiment.

In the first embodiment, the failure in a read operation with the second communication mode is regarded that multifunctional printer 1 is in the energy saver mode. However, in the second embodiment, an identification code (energy saver code or energy saver cancel code) returned from multifunctional printer 1 at the negotiation is used to determine the current mode of multifunctional printer 1.

In particular, PC 3 directly performs a read operation on multifunctional printer 1 without performing a write operation (ST 1601). After the read operation, multifunctional printer 1 returns an identification code during a negotiation in the preliminary stage. In this example, the energy saver code is already set in ST 906, thus the energy saver code is returned. According to the response, PC 3 determines that multifunctional printer 1 is in the energy saver mode (ST 1602).

The process in multifunctional printer 1 upon receiving the read operation of ST 1601 in FIG. 16 is illustrated referring to FIG. 15. When activating the energy saver mode at ST 906, main CPU 202 sets the output of a transmission interruption masking signal in interruption masking register 1502. Also, an energy saver code is set in data register 808.

In order to perform a read operation, PC 3 negotiates with multifunctional printer 1 in the preliminary stage. This negotiation request from PC 3 is input to negotiation control circuit 1501. Upon receiving the negotiation request, negotiation control circuit 1501 responds to the negotiation based on the identification code set in data register 808 (energy saver code or energy saver cancel code).

In this example, the energy saver code is set in data register 808, negotiation control circuit 1501 responds to PC 3 that multifunctional printer 1 is in the energy saver mode. Upon receiving this response, PC 3 recognizes that multifunctional printer 1 is in the energy saver mode.

With the negotiation response from multifunctional printer 1, the negotiation is completed. In this case, PC 3 starts a read operation. Upon starting the read operation, PC 3 transmits parallel data including a transmission interruption signal to perform the read operation. This parallel data is input to data transfer control circuit 801. Data transfer control circuit 801 detects the transmission interruption signal in the parallel data and input the same in one of the input terminals of determination circuit 804.

Also, a transmission interruption masking signal is input to the other input terminal of determination circuit 804 from interruption masking register 1502. Therefore, the transmission interruption signal is not output from determination circuit 804 to determination circuit 807. Also, since determination circuit 807 does not output the transmission interruption signal to sub CPU 213, multifunctional printer 1 does not respond to the read operation. Therefore, main CPU 202 will not start because of this read operation by PC 3.

During the status monitoring using the second communication mode as described above, PC 3 sends a printing request (ST 909). PC 3 performs both write and read operations using the first communication mode for the printing request, which actually requires the cancellation of the energy saver mode, similar to the first embodiment. Therefore, when a printing request is made by PC 3, a write operation is performed on multifunctional printer 1 (ST 910). The process of multifunctional printer 1 upon receiving the write operation is the same as in the first embodiment. Main CPU 202 is started by the write operation.

After main CPU 202 is started, the energy saver mode of multifunctional printer 1 is cancelled, and the ready mode is reactivated (ST 911). At this time, main CPU 202 cancels the setting of the interruption masking signal of interruption masking register 1502 in parallel control circuit 703, and sets an energy saver cancel code in data register 808.

After reactivating the ready mode, PC 3 monitors the status of multifunctional printer 1 using the first communication mode according to ST 913 and ST 914, similar to the first embodiment. Accordingly, the series of operations are performed to cancel the energy saver mode by PC 3's request after activating the energy saver mode in multifunctional printer 1 of the second embodiment.

For canceling the energy saver mode by the request of multifunctional printer 1, the process for status monitoring during the ready mode, between multifunctional printer 1 and connecting PC 3 in the second embodiment, is the same as the first embodiment shown in FIG. 17. Also, after activating the energy saver mode, the process of PC 3's performing the status monitoring with the second communication mode and determining the mode of multifunctional printer 1 by an identification code returned from multifunctional printer 1 is the same as in FIG. 16 (ST 1601 and 1602).

As in ST 1601 and ST 1602, an energy saver cancel factor is generated in multifunctional printer 1 during the status monitoring using the second communication mode (ST 1603). At this time, main CPU 202 cancels the setting of the interruption masking signal in interruption masking register 1502 in parallel control circuit 703, and the energy saver cancel code is set in data register 808.

At this time, PC 3 does not recognize that the energy saver cancel factor is generated in multifunctional printer 1. Therefore, PC 3 performs a read operation to monitor the status of multifunctional printer 1 with the second communication mode (ST 1604).

After the read operation, during a negotiation performed in the preliminary stage, multifunctional printer 1 returns an identification code as in ST 1602. Since the energy saver code is already set because of the energy saver cancel factor, the energy saver cancel code is returned. According to this response, PC 3 determines that multifunctional printer 1 is in the energy saver mode (ST 1605).

The process of multifunctional printer 1 upon receiving the read operation shown in ST 1604 of FIG. 16 is illustrated referring to FIG. 15. Because of the energy saver cancel factor generated at ST 1603, interruption masking register 1502 has the setting so that the transmission interruption masking signal is not output. An energy saver cancel code is set in data register 808.

When a read operation is performed, a negotiation is done in the preliminary stage as described above. A negotiation request from PC 3 is input to negotiation control circuit 1501. Upon receiving the negotiation request, negotiation control circuit 1501 responds to the negotiation based on the code set in data register 808 (energy saver code or energy saver cancel code).

In this example, since the energy saver cancel code is set in data register 808, negotiation control circuit 1501 responds to PC 3 that multifunctional printer 1 is in the ready mode. Upon receiving this response, PC 3 recognizes that multifunctional printer 1 is in the ready mode.

Upon completing the negotiation with the negotiation response from multifunctional printer 1, PC 3 starts a read operation. When the read operation is started, PC 3 transmits the parallel data including a transmission interruption signal for performing the read operation. This parallel data is input to data transfer control circuit 801. Data transfer control circuit 801 detects the transmission interruption signal from the parallel data and input the same to one of the input terminals of determination circuit 804.

The transmission interruption masking signal is not input to the other input terminal of determination circuit 804 from interruption masking register 1502. Therefore, determination circuit 804 outputs the transmission interruption signal to determination circuit 807. Accordingly, determination circuit 807 outputs the transmission interruption signal to sub CPU 213. This transmission interruption signal is treated as an energy saver cancel signal at sub CPU 213, however, the energy saver cancellation signal is already input to sub CPU 213 because of the energy saver cancel factor of ST 1604, thus main CPU 202 is already started. Therefore, sub CPU 213 informs main CPU 202 that the transmission interruption signal is received.

Upon receiving this information, main CPU 202 responds to a read operation of PC 3. Since this read operation is requesting a status monitoring, main CPU 202 responds to PC 3 regarding the status of multifunctional printer 1.

After responding to PC 3 that multifunctional printer 1 is in the ready mode in ST 1604, multifunctional printer 1 cancels the energy saver mode and reactivates the ready mode. When the ready mode is reactivated, PC 3 monitors the status of multifunctional printer 1 using the first communication mode, similar to the first embodiment according to ST 1004 and ST 1005. Accordingly, the series of operations for canceling the energy saver mode by the request of multifunctional printer 1 is performed, after activating the energy saver mode at multifunctional printer 1.

Accordingly, in multifunctional printer 1 of the present embodiment, parallel control circuit 703 of PC I/F board 407 sets an identification code according to the current mode of multifunctional printer 1. When there is an access from PC 3 during the energy saver mode, the current mode of multifunctional printer 1 is informed according to the identification code. Therefore, it is possible to respond to the status monitoring of PC 3 without starting main CPU 202 during PC 3's status monitoring in the energy saver mode. Thus, it is possible to minimize the power consumption during the energy saver mode, enable the status monitoring function of a PC, and prevent the system from impairing the energy saver mode in multifunctional printer.

PC 3, on the other hand, determines that multifunctional printer 1 is in the energy saver mode when an energy saver code is retrieved from multifunctional printer 1, while determining that multifunctional printer 1 is in the ready mode when retrieving an energy saver cancel code. Thus, it is possible to determine the current mode of multifunctional printer 1 without starting main CPU 202 of multifunctional printer 1 even if multifunctional printer 1 is in the energy saver mode. Therefore, it is possible to minimize the power consumption during the energy saver mode, enable the status monitoring function of a PC, and prevent the system from impairing the energy saver mode in a multifunctional printer functioning as printer for a PC.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2001-256842 filed on Aug. 27, 2001, entire content of which is expressly incorporated by reference herein.

What is claimed is:

1. A multifunctional printer, comprising:
   a main controller that controls an entire multifunctional printer;
   a main power unit that supplies power to said main controller;
   an energy saver controller that shuts down the power supply from said main power unit to said main controller at a predetermined condition and restores the power supply from said main power unit to said main controller upon detecting a factor canceling the power supply shut-down;
   an interface unit that informs said energy saver controller about the factor canceling the power supply shut-down when an external terminal apparatus transmits a printing request to the multifunctional printer; and
   a sub power unit that supplies power to at least said energy saver controller and said interface unit separately from said main power unit,
   the interface further does not inform said energy saver controller about the factor canceling the power supply shut-down when the external terminal apparatus accesses the multifunctional printer to monitor a status of the multifunctional printer.

2. The multifunctional printer according to claim 1, wherein said main controller prohibits said interface unit from informing said energy saver controller that said interface unit is accessed by the external terminal apparatus upon activating the energy saver mode.

3. A The multifunctional printer according to claim 2, wherein said main controller cancels the prohibition in said interface unit from informing said energy saver controller that said interface unit is accessed by the external terminal apparatus upon canceling the energy saver mode.

4. A multifunctional printer, comprising:
   a main controller that controls an entire multifunctional printer;

a main power unit that supplies power to said main controller;

an energy saver controller that shuts down the power supply from said main power unit to said main controller at a predetermined condition and restores the power supply from said main power unit to said main controller upon detecting a factor canceling the power supply shut-down;

an interface unit that informs said energy saver controller about the factor canceling the power supply shut-down upon detecting a printing request from an external terminal apparatus; and a sub power unit that supplies power to said energy saver controller and said interface unit separately from said main power unit, said main controller further prohibits said interface unit from informing said energy saver controller that said interface unit is accessed by the external terminal apparatus with a communication mode, the communication mode performing only a read operation on the multifunctional printer, upon activating the energy saver mode.

5. The multifunctional printer according to claim 4, wherein said main controller cancels the prohibition in said interface unit from informing said energy saver controller that said interface unit is accessed by the external terminal apparatus with a communication mode performing only a read operation on the multifunctional printer, upon canceling the energy saver mode.

6. A multifunctional printer, comprising:

a main controller that controls an entire multifunctional printer;

a main vower unit that supplies power to said main controller;

an energy saver controller that shuts down the vower supply from said main power unit to said main controller at a predetermined condition and restores the power supply from said main power unit to said main controller upon detecting a factor canceling the power supply shut-down;

an interface, unit that informs said energy saver controller about the factor canceling the power supply shut-down upon detecting a printing request from an external terminal apparatus; and a sub power unit that supplies power to said energy saver controller and said interface unit separately from said main power unit, wherein said interface unit informs said energy saver controller when accessed by the external terminal apparatus in a ready mode, while not informing said energy saver controller when accessed by the external terminal apparatus in an energy saver mode.

7. The multifunctional printer according to claim 6, wherein said interface unit informs said energy saver controller when accessed by the external terminal apparatus with a communication mode in a ready mode, the communication mode performing only a read operation on the multifunctional printer, while not informing said energy saver controller when accessed by the external terminal apparatus with the communication mode in an energy saver mode.

8. The multifunctional printer according to claim 6, wherein said interface unit informs said energy saver controller when accessed by the external terminal apparatus with a first communication mode in an energy saver mode, the first communication mode performing a write operation on the multifunctional printer, while not informing said energy saver controller when accessed by the external terminal apparatus with a second communication mode in the energy saver mode, the second communication mode performing only a read operation on the multifunctional printer.

9. The multifunctional printer according to claim 8, wherein the printing request from the external terminal apparatus is made in the first communication mode.

10. The multifunctional printer according to claim 6, wherein said interface unit includes a memory that stores information indicating whether the multifunctional printer is in an energy saver mode and a transmission section that transmits the stored information of the memory to the external terminal apparatus without notifying said energy saver controller when accessed by the external terminal apparatus in the energy saver mode, and wherein said main controller enables the memory to store the information that the multifunctional printer is in the energy saver mode when the energy saver mode is activated, and that the multifunctional printer is not in the energy saver mode when the energy saver mode is canceled.

11. A terminal apparatus, comprising:

an interface unit connected to an external multifunctional printer;

a status monitoring unit that monitors status of multifunctional printer with periodic accesses with a first communication mode performing write and read operations on the multifunctional printer when the multifunctional printer is in a ready mode, and with a second communication mode performing only a reading operation on the multifunctional printer when the multifunctional printer is in an energy saver mode; and a controller that enables said status monitoring unit to switch its mode to the second communication mode upon receiving a notification that the multifunctional printer will be in the energy saver mode.

12. The terminal apparatus according to claim 11, wherein said controller enables said status monitoring unit to periodically access the multifunctional printer with the second communication mode after receiving a notification that the multifunctional printer will be activating the energy saver mode from the multifunctional printer, and determines that the multifunctional printer is in the energy saver mode if no response is received from the multifunctional printer in response to the access.

13. The terminal apparatus according to claim 11, wherein said controller enables said status monitoring unit to periodically access the multifunctional printer with the second communication mode after receiving a notification that the multifunctional printer will be activating the energy saver mode from the multifunctional printer, determines that the multifunctional printer is in the energy saver mode if no response is received from the multifunctional printer in response to the access, and determines that the multifunctional printer is in the ready mode if a response is received.

14. The terminal apparatus according to claim 11, wherein said controller enables said status monitoring unit to periodically access the multifunctional printer with the second communication mode after receiving a notification that the multifunctional printer will be activating the energy saver mode from the multifunctional printer, and determines that the multifunctional printer is in the energy saver mode upon reading information that the multifunctional printer is in the energy saver mode.

15. The terminal apparatus according to claim 11, wherein said controller enables said status monitoring unit to periodically access the multifunctional printer with the second communication mode after receiving a notification that the multifunctional printer will be activating the energy saver mode from the multifunctional printer, and determines that the multifunctional printer is in the ready mode upon reading information that the multifunctional printer is not in the energy saver mode.

16. The terminal apparatus according to claim 11, wherein said interface unit, said status monitoring unit and said controller comprises parts of a personal computer.

17. A network system, comprising:

a multifunctional printer that shuts down a power supply to a main controller in an energy saver mode and restores the power supply by an access from an external terminal apparatus; and an external terminal apparatus that accesses the multifunctional printer by switching a first communication mode performing write and read operations and a second communication mode performing only a read operation;

wherein the external terminal apparatus periodically monitors a status of the multifunctional printer with the second communication mode, when the multifunctional printer is in the energy saver mode, said multifunctional printer does not restore the power supply to the main controller even if a read command is detected, and does not respond to the external terminal apparatus, whereby the external terminal apparatus determines that the multifunctional printer is in the energy saver mode.

18. A personal computer, comprising:

a keyboard used as an input section;

a display that displays video data;

an interface unit connected to an external multifunctional printer;

a status monitoring unit that monitors a status of the multifunctional printer with periodic accesses with a first communication mode performing write and read operations on the multifunctional printer when the multifunctional printer is in a ready mode, and with a second communication mode performing only a reading operation on the multifunctional printer when the multifunctional printer is in an energy saver mode; and a controller that enables said status monitoring unit to switch its mode to the second communication mode upon receiving a notification that the multifunctional printer will be in the energy saver mode.

19. The personal computer according to claim 18, wherein said controller enables said status monitoring unit to periodically access the multifunctional printer with the second communication mode after receiving a notification that the multifunctional printer will be activating the energy saver mode from the multifunctional printer, and determines that the multifunctional printer is in the energy saver mode if no response is received from the multifunctional printer in response to the access.

20. The personal computer according to claim 18, wherein said controller enables said status monitoring unit to periodically access the multifunctional printer with the second communication mode after receiving a notification that the multifunctional printer will be activating the energy saver mode from the multifunctional printer, determines that the multifunctional printer is in the energy saver mode if no response is received from the multifunctional printer in response to the access, and determines that the multifunctional printer is in the ready mode if a response is received.

* * * * *